US006829568B2

(12) United States Patent
Julier et al.

(10) Patent No.: US 6,829,568 B2
(45) Date of Patent: Dec. 7, 2004

(54) METHOD AND APPARATUS FOR FUSING SIGNALS WITH PARTIALLY KNOWN INDEPENDENT ERROR COMPONENTS

(76) Inventors: Simon Justin Julier, 3913 Larchwood Rd., Falls Church, VA (US) 22061-1107; Jeffrey Kent Uhlmann, 115 Crest Ave., Holts Summit, MO (US) 65043

(*) Notice: Subject to any disclaimer, the term of this patent is extended or adjusted under 35 U.S.C. 154(b) by 58 days.

(21) Appl. No.: 10/132,309

(22) Filed: Apr. 26, 2002

(65) Prior Publication Data

US 2003/0204382 A1 Oct. 30, 2003

(51) Int. Cl.[7] ............................................. G06F 15/00
(52) U.S. Cl. ..................................... 702/189; 702/196
(58) Field of Search ................................ 702/189, 190, 702/196

(56) References Cited

U.S. PATENT DOCUMENTS 6,061,068 A * 5/2000 Hoffman, II et al. ....... 345/619
6,092,033 A * 7/2000 Uhlmann .................... 702/189

OTHER PUBLICATIONS

Durrant–Whyte, H; Rao, B; Hu,H ("Toward a Fully Decentralized Architecture for Multi–Sensor Data Fusion"; IEEE Intl Conference Proceedings on Robotics and Automation; Vol 2; May 13–18, 1990; pp 1331–1336).*

Julier, S; Uhlmann, J; ("A Non–Divergent Estimation Algorithm in the Presence of Unknown Correlations"; Proceedings of American Control Conference; Vol 4; Jun. 4–6, 1997; pp 2369–2373).*

Julier, S; Uhlmann, J; Durrant–Whyte, H; ("A New Method for the Nonlinear Transformation of Means and Covariance in Filters and Estimators"; IEEE Transactions on Automatic Control; Vol 45, No. 3; Mar. 2000; pp 477–482).*

Austin, D; Jensfelt, P; ("Using Multiple Gaussian Hypotheses to Represent Probability Distributionfor Mobile Robot Localization"; IEEE Intl Conference on Robotics and Automation; Vol 2; Apr. 24–28, 2000; pp 1036–1041).*

(List continued on next page.)

*Primary Examiner*—John Barlow
*Assistant Examiner*—Douglas N Washburn

(57) ABSTRACT

A method and apparatus is described for fusing a plurality of signals corresponding to estimates of the state of an object, system, or process. The method and apparatus is specialized or programmed for (1) receiving estimates, each of which can be expressed in the form of a state vector and an error covariance matrix, at least one estimate of which can be decomposed into a sum of an independent error covariance matrix and a potentially correlated error covariance matrix, and (2) transmitting a resulting signal corresponding to an estimate, which can be expressed in the form of a state vector and an error matrix, in order to evoke a physical response from a system receiving the signal. The method and apparatus provides advantages over the prior art by improving the accuracy of fused estimates while guaranteeing consistency.

18 Claims, 4 Drawing Sheets

OTHER PUBLICATIONS

Julier, S; ("A Sparse Weight Kalman Filter Approach to Simultaneous Localisation and Map Building"; Proceedings of IEEE Intl Conference on Intelligent Robots and Systems; Oct. 29–Nov. 3, 2001; pp 1251–1256).*

Julier, S; Uhlmann, J; ("Simultaneous Localisation and Map Building Using Split Covariance Intersection"; Proceedings of IEEE Intl Conference on Intelligent Robots and Systems; Oct. 29–Nov. 3, 2001; pp 1257–1262).*

Arambel, P; Rago, C; Mehra, R; ("Covariance Intersection Algorithm for Distributed Spacecraft State Estimation"; Proceedings of American Control Conference; Jun. 25–27, 2001; pp 4398–4403).*

Hanebeck, U; Briechle, K; ("New Results for Stochastic Prediction and Filtering with Unknown Correlations"; International Conference on Multi–sensor Fusion and Integration for Intelligent Systems; Aug. 20–22, 2001; pp pp147–152).*

Xu, X; Negahdaripour, S; ("Application of Extended Covariance Intersection Principle for Mosaic–Based Optical Positioning and Navigation of Underwater Vehicles"; Proceedings of IEEE Intl Conference on Robotics and Automation; May 21–26, 2001; pp 2759–2766).*

Julier, S; Uhlmann, J; ("A Counter Example to the Theory of Simultaneous Localization and Map Building"; Proceedings of IEEE Intl Conference on Robotics and Automation; May 21–26, 2001; pp 4238–4243).*

Julier, S; ("The Scaled Unscented Transformation"; Proceedings of American Control Conference; May 8–10, 2002; pp 4555–4559).*

Julier, S; Uhlmann, J; Durrant–Whyte, H; ("A New Approach for Filtering Nonlinear Systems"; Proceedings of American Control Conference; 1995; pp 1628–1632).*

* cited by examiner

METHOD AND APPARATUS FOR FUSING SIGNALS WITH PARTIALLY KNOWN INDEPENDENT ERROR COMPONENTS

BACKGROUND OF THE INVENTION

1. Field of the Invention

This invention relates generally to a signal processing method and apparatus for fusing a plurality of signals corresponding to estimates of the state of an object, system, or process. The method and apparatus is specialized or programmed for (1) receiving estimates, each of which can be expressed in the form of a state vector and an error covariance matrix (at least one estimate of which can be decomposed into a sum of an independent error covariance matrix and a potentially correlated error covariance matrix), and (2) transmitting a resulting signal corresponding to an estimate, which can be expressed in the form of a state vector and an error matrix, in order to evoke a physical response from a system receiving the signal.

2. Discussion of Background and Prior Art

2.1 The Data Fusion Signal Processing Problem:

The data fusion problem is essentially one of producing a single estimate of the state of an object, system, or process that combines information from multiple estimates related to the state of that object, system, or process. A typical physical example of a data fusion system is a tracking filter that maintains an estimate of the position, speed, and bearing of an autonomous vehicle and must fuse that estimate with estimate signals obtained from physical sensors, which measure quantities related to the state of the vehicle, in order to produce a single improved estimate signal that can be used by a controlling device to precisely steer the vehicle.

A signal herein is defined as any measurable quantity that is related to the changing of the physical state of a process, system, or substance. A signal includes, but is not limited to, radiation produced by a natural or man made process, electrical fluctuations produced by a natural or a man made process, distinctive materials or chemicals produced by a natural or man made process, distinctive structures or configurations of materials produced by a natural or man made process, or distinctive patterns of radiation or electrical activity produced by a natural or a man made process.

Most generally, a signal representing a measurement of any physical system inherently has some degree of random error associated therewith. Thus, the model of any physical system, if it is to accurately account for that random error, must include a way to estimate the expected values and uncertainties in the values of the physical system that occur due to the random error. Some methods assume that the error values have known, relatively small, bounded magnitudes. Unfortunately, such bounds are typically unavailable in practice, so bounded error approaches are not widely applied. More generally, only estimates of the expected error values can be made, as will be discussed subsequently.

The measurement of a signal is provided by a measuring device. A measuring device as defined herein may be, but is not limited to, any physical device that interacts with a physical system and provides information that can be converted into an estimate comprised of a nominal estimate of the state of the system and an estimate of the error associated with that nominal state estimate. A measuring device as defined herein includes any device that emits a signal and measures the change of the signal upon its return, a device that measures a signal that is naturally produced by a physical process, or any device that measures a signal that is produced by a man made process.

2.2 Data Fusion For Signals Containing Mean and Covariance Information:

In one of the most common formulations of the data fusion problem, each estimate is represented as, or can be converted to, a pair comprising a state vector (often referred to as the mean) a and an error matrix A, denoted $\{a, A\}$. The state vector a is a (column) vector composed of m elements in which element $a_i$ corresponds to a variable, such as size or temperature, describing the state of a system of interest. The error matrix A is a matrix having m rows and m columns in which the element $A_{ij}$, for any choice of i and j between 1 and m, is related to the expected value of the product of the errors associated with the values stored in elements $a_i$ and $a_j$. If the value of element $A_{ij}$ is precisely the expected value of the product of the errors associated with the values stored in elements $a_i$ and $a_j$, for any choice of i and j between 1 and m, then A is referred to as the error covariance of the estimated state vector a.

The error matrix A is often referred to as a covariance matrix according to a general definition of a covariance matrix as being a symmetric matrix with nonnegative eigenvalues, but A is not in general the true error covariance T associated with the state estimate a because T is usually unknown. The standard practice is to choose A large enough that it can be assumed to be of the form A=T+E, where E is an unknown covariance matrix representing the overestimated components of A. An overestimated covariance matrix is said to be "conservative" because it suggests that the state estimate is less accurate than it actually is. This is preferred to an underestimated covariance that suggests that the state estimate is more accurate than it actually is. For example, an underestimated covariance could lead a chemical plant operator to believe that the state of a chemical reaction is comfortably within safe operating bounds when in fact the magnitude of the errors in the state estimate are sufficiently large that the true state could easily be outside of the bounds.

The terms mean and covariance sometimes will be used hereafter as abbreviations for state vector and error matrix, respectively, in a manner consistent with colloquial usage in the fields of estimation, filtering, and data fusion.

The data fusion problem for mean and covariance estimates is exemplified by the case of two conservative estimates $\{a, A\}$ and $\{b, B\}$, generated from different sensors, of the state of an autonomous vehicle. In order to steer the vehicle it is necessary to fuse the given estimates into a single estimate to be used by the steering mechanism. A trivial (though apparently never described in the literature) approach for fusing the two estimates would be to produce a fused estimate that consists only of the estimate having the "smaller" covariance matrix, in terms of some measure such as the trace or determinant, and disregard any information contained in the other estimate. In order to avoid having to disregard information from one of the estimates, it is necessary to have a means for generating a fused estimate that combines information from both given estimates and is still guaranteed to be conservative.

2.3 The Kalman Filter Update Equation:

The method that is most commonly used for fusing mean and covariance estimates is the Kalman update equation, which is the fundamental component of the well known Kalman filter. The Kalman update equation is known to generate an optimal conservative fused estimate $\{c, C\}$ from given estimates $\{a, A\}$ and $\{b, B\}$ as long as the errors associated with a and b are not correlated. If the errors are correlated, however, then the Kalman estimate is not guaranteed to be conservative. An enhancement to the Kalman update equation has been developed for the case when the exact degree of correlation (defined by a cross covariance matrix) is known, but it cannot be applied in the general case when the degree of correlation is unknown.

A common approach for addressing the problem of fusing correlated estimates is to use the Kalman update equation, knowing that it may yield an underestimated covariance matrix, and then enlarge the resulting covariance matrix by some ad hoc heuristic method so that it can be assumed conservative. In many problem areas, such as in large decentralized data fusion networks, the problem is most acute because no amount of heuristic tweaking can avoid the limitations of the Kalman update algorithm. This is of enormous consequence because of the general trend toward decentralization in complex military and industrial systems.

The motivation for decentralization is that it can provide a degree of scalability and robustness that cannot be achieved with traditional centralized architectures. In industrial applications decentralization offers the possibility of producing plug-and-play systems in which sensors can be slotted in and out to optimize a tradeoff between price and performance. This has significant implications for military systems as well because it can dramatically reduce the time required to incorporate new computational and sensing components into fighter aircraft, ships, and other types of platforms.

Although the notion of decentralization has a strong intuitive appeal—and has so for several decades—achieving its anticipated benefits has been extremely difficult. Specifically, it is known that if communications paths are not strictly controlled, pieces of information begin to propagate redundantly. When these pieces of information are reused (i.e., double-counted), the fused estimates produced at different nodes in the network are corrupted. Various approaches for avoiding this problem were examined, but none seemed completely satisfactory. In the mid 1990s the redundant information problem was revealed to be far more than just a practical challenge; it is a manifestation of a fundamental theoretical limitation that could not be surmounted using traditional Bayesian control and estimation methods such as the Kalman filter [1]. In response to this situation, a new data fusion framework, based on Covariance Intersection (CI), was developed. The CI framework effectively supports all aspects of general decentralized data fusion.

2.4 Decentralized Data Fusion

A decentralized data fusion system is a collection of processing nodes, connected by communication links, in which none of the nodes has knowledge about the overall network topology. Each node performs a specific computing task using information from nodes with which it is linked, but no "central" node exists that controls the network. There are many attractive properties of such decentralized systems [2], including:

1. Decentralized systems are reliable in the sense that the loss of a subset of nodes and/or links does not necessarily prevent the rest of the system from functioning. In a centralized system, however, the failure of a common communication manager or a centralized controller can result in immediate catastrophic failure of the system.
2. Decentralized systems are flexible in the sense that nodes can be added or deleted by making only local changes to the network. For example, the addition of a node simply involves the establishment of links to one or more nodes in the network. In a centralized system, however, the addition of a new node can change the topology in such a way as to require massive changes to the overall control and communications structure.

The most important class of decentralized networks involves nodes associated with sensors or other information sources. Information from distributed sources propagates through the network so that each node obtains the data relevant to its own processing task. In a battle management application, for example, one node might be associated with the acquisition of information from reconnaissance photographs, another with ground-based reports of troop movements, and another with the monitoring of communications transmissions. Information from these nodes could then be transmitted to a node that estimates the position and movement of enemy troops. The information from this node could then be transmitted back to the reconnaissance photo node, which would use the estimated positions of troops to aid in the interpretation of ambiguous features in satellite photos.

In most applications, the information propagated through a network is converted to a form that provides the estimated state of some quantity of interest. In many cases, especially in industrial applications, the information is converted into means and covariances that can be combined within the framework of Kalman-type filters. A decentralized network for estimating the position of a vehicle, for example, could combine acceleration estimates from nodes measuring wheel speed, from laser gyros, and from pressure sensors on the accelerator pedal. If each independent node provides the mean and variance of its estimate of acceleration, fusing the estimates to obtain a better filtered estimate is relatively easy.

The most serious problem arising in decentralized data fusion networks is the effect of redundant information [3]. Specifically, pieces of information from multiple source cannot be combined within most filtering frameworks unless they are independent or have a known degree of correlation (i.e., known cross covariances). In the battle management example described above, the effect of redundant information can be seen in the following scenario:[1]

[1]This type of problem is sometimes referred to as the "whispering in the hall" problem.

1. The photo reconnaissance node transmits information about potentially important features. This information then propagates through the network, changing form as it is combined with information at other nodes in the process.
2. The troop position estimation node eventually receives the information in some form and notes that one of the indicated features could possibly represent a mobilizing tank battalion at position x. There are many other possible interpretations of the feature, but the possibility of a mobilizing tank battalion is deemed to be of such tactical importance that it warrants the transmission of a low confidence hypothesis (a "heads up" message). Again, the information can be synopsized, augmented, or otherwise transformed as it is relayed through a sequence of nodes.
3. The photo reconnaissance photo node receives the low confidence hypothesis that a tank battalion may have mobilized at position x. A check of available reconnaissance photos covering position x reveals a feature that is consistent with the hypothesis. Because the node is unaware that the hypothesis was based on that same photographic evidence, it assumes that the feature which it observes is an independent confirmation of the hypothesis. The node then transmits high confidence information that a feature at position x represents a mobilizing tank battalion.

4. The troop position node receives information from the photo reconnaissance node that a mobilizing tank battalion has been identified with high confidence. The troop position node regards this as confirmation of its early hypothesis and calls for an aggressive response to the mobilization.

The obvious problem is that the two nodes are exchanging redundant pieces of information but are treating them as independent pieces of evidence mounting in support of the hypothesis that a tank battalion has mobilized. The end result is that critical resources may be diverted in reaction to what is, in fact, a low probability hypothesis.

A similar situation can arise in a decentralized monitoring system for a chemical process:

1. A reaction vessel is fitted with a variety of sensors, including a pressure gauge.
2. Because the bulk temperature of the reaction cannot be measured directly, a node is added that uses pressure information, combined with a model for the reaction, to estimate temperature.
3. A new node is added to the system which uses information from the pressure and temperature nodes.

Clearly, the added node will always be using redundant information from the pressure gauge. If the estimates of pressure and temperature are treated as independent, then the fact that their relationship is always exactly what is predicted by the model might lead to over confidence in the stability of the system. This type of inadvertent use of redundant information arises commonly when attempts are made to decompose systems into functional modules. The following example is typical:

1. A vehicle navigation and control system maintains one Kalman filter for estimating position and a separate Kalman filter for maintaining the orientation of the vehicle.
2. Each filter uses the same sensor information.
3. The full vehicle state is determined (for prediction purposes) by combining the position and orientation estimates.
4. The predicted position covariance is computed essentially as a sum of the position and orientation covariances (after the estimates are transformed to a common vehicle coordinate frame).

The problem in this example is that the position and orientation errors are not independent. This means that the predicted position covariance will underestimate the actual position error. Obviously, such overly confident position estimates can lead to unsafe maneuvers.

To avoid the potentially disastrous consequences of redundant data on Kalman-type estimators, covariance information must be maintained. Unfortunately, maintaining consistent cross covariances in arbitrary decentralized networks is not possible [1]. In only a few special cases, such as tree and fully connected networks, can the proliferation of redundant information be avoided. These special topologies, however, fail to provide the reliability advantage because the failure of a single node or link results in either a disconnected network or one which is no longer able to avoid the effects of redundant information. Intuitively, the redundancy of information in a network is what provides reliability; therefore, if the difficulties with redundant information are avoided by eliminating redundancy, then reliability will be also be eliminated.

The proof that cross covariance information cannot be consistently maintained in general decentralized networks seems to imply that the purported benefits of decentralization are unattainable. However, the proof relies critically on the assumption that some knowledge of the degree of correlation is necessary in order to fuse pieces of information. This is certainly the case for all classical data fusion mechanisms (e.g., the Kalman filter and Bayesian Nets), which are based on applications of Bayes' rule. Furthermore, independence assumptions are also implicit in many ad hoc schemes that compute averages over quantities with intrinsically correlated error components.[2]

[2] Dubious independence assumptions have permeated the literature over the decades and are now almost taken for granted. The fact is that statistical independence is an extremely rare property. Moreover, concluding that an approach will yield good approximations when "almost independent" is replaced with "assumed independent" in its analysis is usually erroneous.

The problems associated with assumed independence are often side stepped by artificially increasing the covariance of the combined estimate. This heuristic (or filter "tuning") can prevent the filtering process from producing nonconservative estimates, but substantial empirical analysis and "tweaking" is required to determine how much to increase the co-variances. Even with this empirical analysis, the integrity of the Kalman filter framework is compromised and reliable results cannot be guaranteed. In many applications, such as in large decentralized signal/data fusion networks, the problem is much more acute and no amount of heuristic tweaking can avoid the limitations of the Kalman filter framework [2]. This is of enormous consequence, considering the general trend toward decentralization in complex military and industrial systems.

In summary, the only plausible way to simultaneously achieve robustness, flexibility, and consistency in a general decentralized network is to exploit a data fusion mechanism that does not require independence assumptions. Such a mechanism, called Covariance Intersection (CI), satisfies this requirement.

2.5 Covariance Intersection 2.5.1 Problem Statement

Consider the following problem. Two pieces of information, labeled A and B, are to be fused together to yield an output, C. This is a very general type of data fusion problem. A and B could be two different sensor measurements (e.g., a batch estimation or track initialization problem), or A could be a prediction from a system model and B could be sensor information (e.g., a recursive estimator similar to a Kalman filter). Both terms are corrupted by measurement noises and modeling errors, so their values are known imprecisely. Therefore, A and B are the random variables a and b, respectively. Assume that the true statistics of these variables are unknown. The only available information are estimates of the means and covariances of a and b and the cross-correlations between them. These are $\{\bar{a}, A\}$, $\{\bar{b}, B\}$ and 0 respectively.[3]

[3] Cross correlation can also be treated as a non-zero value. For brevity, we do not discuss this case here.

$$\bar{P}_{aa} = E[\tilde{a}\tilde{a}^T] \quad \bar{P}_{ab} = E[\tilde{a}\tilde{b}^T] \quad \bar{P}_{bb} = E[\tilde{b}\tilde{b}^T] \quad (1)$$

where $\tilde{a} \triangleq \bar{a} - a$ and $\tilde{b} \triangleq \bar{b} - b$ are the true errors imposed by assuming that the means are $\bar{a}$ and $\bar{b}$. Note that the cross-correlation matrix between the random variables, $\bar{P}_{ab}$, is unknown and will not, in general, be 0.

The only constraint that we impose on the assumed estimate is consistency. In other words, $$A - \bar{P}_{aa} \geq 0,$$

$$B - \bar{P}_{bb} \geq 0. \quad (2)$$

This definition conforms to the standard definition of consistency [4]. The problem is to fuse the consistent estimates of A and B together to yield a new estimate C, $\{\bar{c}, C\}$, which is guaranteed to be consistent:

$$C - \tilde{P}_{cc} \geq 0 \qquad (3)$$

where $\tilde{c} \triangleq \bar{c} - c$ and $\overline{P}_{cc} = E[\tilde{c}\tilde{c}^T]$.

2.5.2 The Basic Covariance Intersection Algorithm

In its generic form, the Covariance Intersection (CI) algorithm takes a convex combination of mean and covariance estimates that are represented information (inverse covariance) space. The intuition behind this approach arises from a geometric interpretation of the Kalman filter equations. It can be shown that the general form of the Kalman filter equation can be written as $$\bar{c} = W_a \bar{a} + W_b \bar{b} \qquad (4)$$

$$C = W_a A W_a^T + W_a P_{ab} W_b^T + W_b P_{ba} W_a^T + W_b B W_b^T. \qquad (5)$$

where the weights $W_a$ and $W_b$ are chosen to minimize the trace of C. This form reduces to the conventional Kalman filter if the estimates are independent ($P_{ab}=0$) and generalizes to the Kalman filter with colored noise when the correlations are known.

These equations have a powerful geometric interpretation: If one plots the covariance ellipses (for a covariance matrix P this is the locus of points $\{p:p^T P^{-1} p = C\}$ where c is a constant) A, B and C for all choices of $P_{ab}$, C always lies within the intersection of A and B.

This interpretation suggests the following approach: if C lies within the intersection of A and B for any possible choice of $P_{ab}$, then an update strategy that finds a C which encloses the intersection region must be consistent even if there is no knowledge about $P_{ab}$. The tighter the updated covariance encloses the intersection region, the more effectively the update uses the available information.[4]

[4] Note that the discussion of "intersection regions" and the plotting of particular covariance contours should not be interpreted in a way that confuses CI with ellipsoidal bounded region filters. CI does not exploit error bounds, only covariance information.

The intersection is characterized by the convex combination of the covariances, and the Covariance Intersection algorithm is: [5]

$$C^{-1} = \omega P_{aa}^{-1} + (1-\omega) B^{-1} \qquad (6)$$

$$C^{-1}\bar{c} = \omega P_{aa}^{-1} \bar{a} + (1-\omega) B^{-1} \bar{b} \qquad (7)$$

where $\omega \in [0, 1]$.

The parameter $\omega$ manipulates the weights assigned to a and b. Different choices of $\omega$ can be used to optimize the update with respect to different performance criteria, such as minimizing the trace or the determinant of C. Cost functions, which are convex with respect to $\omega$, have only one distinct optimum in the range $0 \leq \omega \leq 1$. Virtually any optimization strategy can be used, ranging from Newton-Raphson to sophisticated semidefinite and convex programming [6] techniques, which can minimize almost any norm.

Note that some measure of covariance size must be minimized at each update in order to guarantee nondivergence, otherwise an updated estimate could be larger than the prior estimate. For example, if one were to always use $\omega=0.5$, then the updated estimate would simply be the Kalman updated estimate with the covariance inflated by a factor of two. Thus, an update with an observation with a very large covariance could result in an updated covariance close to twice the size of the prior estimate. In summary, the use of a fixed measure of covariance size with the CI equations leads to the nondivergent CI filter.

An example of the tightness of the Covariance Intersection update occurs when the two prior covariances approach singularity:

$$\{\bar{a}, A\} = \left\{ \begin{bmatrix} 1 \\ 0 \end{bmatrix}, \begin{bmatrix} 1.5 & 0.0 \\ 0.0 & \epsilon \end{bmatrix} \right\} \qquad (8)$$

$$\{\bar{b}, B\} = \left\{ \begin{bmatrix} 0 \\ 1 \end{bmatrix}, \begin{bmatrix} \epsilon & 0.0 \\ 0.0 & 1.0 \end{bmatrix} \right\}. \qquad (9)$$

The covariance of the combined estimate is proportional to $\epsilon$, and the mean is centered on the intersection point of the 1-dimensional contours of the prior estimates. This makes sense intuitively because if one estimate completely constrains one coordinate, and the other estimate completely constrains the other coordinate, there is only one possible update that can be consistent with both constraints.

CI can be generalized to an arbitrary number of n>2 updates using the equations:

$$C^{-1} = \omega_1 P_{a_1 a_1}^{-1} + \ldots + \omega_n P_{a_n a_n}^{-1} \qquad (10)$$

$$C^{-1}\bar{c} = \omega_1 P_{a_1 a_1}^{-1} \bar{a}_1 + \ldots + \omega_n P_{a_n a_n}^{-1} \bar{a}_n, \qquad (11)$$

where $$\sum_{i=1}^{n} \omega_i = 1.$$

For this type of batch combination of large numbers of estimates, efficient codes, such as the public domain MAXDET [7] and SPDSOL [8] are available.

In summary, CI provides a general update algorithm that is capable of yielding an updated estimate even when the prediction and observation correlations are unknown.

2.6 Using CI for Distributed Data Fusion

Consider again the case of a data fusion network. The network consists of N nodes whose connection topology is completely arbitrary (i.e., it might include loops and cycles) and can change dynamically. Each node only has information about its local connection topology (e.g., the number of nodes with which it directly communicates, and the type of data sent across each communication link). Assuming that the process and observation noises are independent, the only source of unmodeled correlations are caused by the distributed data fusion system itself. CI can be used to develop a distributed data fusion algorithm that directly exploits this structure: Estimates that are propagated from other nodes are correlated to an unknown degree and must be fused with the state estimate using CI. Measurements taken locally are known to be independent and can be fused using the Kalman filter equations.

Using conventional notation [9], the estimate at the ith node is $\hat{x}_i (k|k)$ with covariance $P_i (k|k)$. CI can be used to fuse the information that is propagated between the different nodes. Suppose that, at time step k+1, node i locally measures the observation vector $z_i (k+1)$. A distributed fusion algorithm for propagating the estimate from timestep k to timestep k+1 for node i is:

1. Predict the state of node i at time k+1 using the standard Kalman filter prediction equations.
2. Use the Kalman filter update equations to update the prediction with $z_i (k+1)$. This update is the distributed estimate with mean $\hat{x}_i^*(k+1|k+1)$ and covariance $P_i^* (k+1|k+1)$. It is not the final estimate because it does not include observations and estimates propagated from the other nodes in the network.

3. Node i propagates its distributed estimate to all of its neighbors.
4. Node i fuses its prediction $\hat{x}_i(k+1|k)$ and $P_i(k+1|k)$ with the distributed estimates that it has received from all of its neighbors to yield the partial update with mean $\hat{x}_i^+(k+1|k+1)$ and covariance $P_i^+(k+1|k+1)$. Because these estimates are propagated from other nodes whose correlations are unknown, the CI algorithm is used. As explained above, if the node receives multiple estimates for the same time step, the batch form of CI is most efficient.
5. Finally, node i uses the Kalman filter update equations to fuse $z_i(k+1)$ with its partial update to yield the the new estimate $\hat{x}_i(k+1|k+1)$ with covariance $P_i(k+1|k+1)$. The reason the node incorporates its observation last using the Kalman filter equations is because it is known to be independent of the prediction or data which has been distributed to the node from its neighbors. Therefore, CI is unnecessary.

An implementation of this algorithm is given in the next section. This algorithm has a number of important advantages. First, all nodes propagate their most accurate partial estimates to all other nodes without imposing any unrealistic requirements for perfectly robust communication. Communication paths may be uni- or bi-directional, there may be cycles in the network, and some estimates may be lost while others are propagated redundantly. Second, the update rates of the different filters do not need to be synchronized. Third, communications do not have to be guaranteed—a node can broadcast an estimate without relying on other nodes receiving it. Finally, each node can use a different observation model: One node may have a high accuracy model for one subset of variables of relevance to it and another node may have a high accuracy model for a different subset of variables, but the propagation of their respective estimates allows nodes to construct fused estimates representing the union of the high accuracy information from both nodes.

The most important feature of the above approach to decentralized data fusion is that it is provably guaranteed to produce and maintain consistent estimates at the various nodes[5] Section 5 demonstrates this consistency in a simple example.

[5]The fundamental feature of Covariance Intersection can be described as: Consistent estimates in, consistent estimates out. The Kalman filter, in contrast, can produce an inconsistent fused estimate from two consistent estimates if the assumption of independence is violated. The only way CI can yield an inconsistent estimate is if a sensor or model introduces an inconsistent estimate into the fusion process. In practice this means that some sort of fault-detection mechanism needs to be associated with potentially faulty sensors.

2.7 Extended Example

Suppose the processing network is used to track the position, velocity and acceleration of a one-dimensional particle. The network is composed of four nodes. Node 1 measures the position of the particle only. Nodes 2 and 4 measure velocity and node 3 measures acceleration. The four nodes are arranged in a ring. From a practical stand point, this configuration leads to a robust system with built-in redundancy: data can flow from one

TABLE 1

Sensor information and accuracy for each node.

| Node | Measures | Variance |
|---|---|---|
| 1 | $x$ | 1 |
| 2 | $\dot{x}$ | 2 |
| 3 | $\ddot{x}$ | 0.25 |
| 4 | $x$ | 3 | node to another through two different pathways. However, from a theoretical point of view this configuration is extremely challenging. Because this configuration is neither fully-connected nor tree-connected, optimal data fusion algorithms exist only in the special case where full knowledge of the network topology and the states at each node is known.

The particle moves using a nominal constant acceleration model with process noise injected into the jerk (derivative of acceleration). Assuming that the noise is sampled at the start of the timestep and is held constant throughout the prediction step, the process model is $$x(k+1) = Fx(k) + Gv(k) \qquad (12)$$

where $$F = \begin{bmatrix} 1 & \Delta T & \Delta T^2/2 \\ 0 & 1 & \Delta T \\ 0 & 0 & 1 \end{bmatrix} \text{ and } G = \begin{bmatrix} \Delta T^3/6 \\ \Delta T^2/2 \\ \Delta T \end{bmatrix}.$$

$v(k)$ is an uncorrelated, zero-mean Gaussian noise with variance $\sigma_v^2=10$ and the length of the time step $\Delta T=0.1$ s.

The sensor information and the accuracy of each sensor is given in Table 1.

Assume, for the sake of simplicity, that the structure of the state space and the process models are the same for each node and the same as the true system. However, this condition is not particularly restrictive and many of the techniques of model and system distribution that are used in optimal data distribution networks can be applied with CI.[10]

The state at each node is predicted using the process model:

$$\hat{x}_i(k+1|k) = F\hat{x}_i(k|k)$$

$$P_i(k+1|k) = FP_i(k+1|k)F^T + Q(k).$$

The partial estimates $\hat{x}_i^*(k+1|k+1)$ and $P_i^*(k+1|k+1)$ are calculated using the Kalman filter update equations. If $R_i$ is the observation noise covariance on the ith sensor, and $H_i$ is the observation matrix, then the partial estimates are $$v_i(k+1) = z_i(k+1) - H_i\hat{x}_i(k+1|k) \qquad (13)$$

$$S_i(k+1) = H_iP_i(k+1|k)H_i^T + R_i(k+1) \qquad (14)$$

$$W_i(k+1) = P_i(k+1|k)H_i^TS_i^{-1}(k+1) \qquad (15)$$

$$\hat{x}_i^*(k+1|k+1) = \hat{x}_i(k+1|k) + W_i(k+1)v_i(k+1) \qquad (16)$$

$$P_i^*(k+1|k+1) = P_i(k+1|k) - W_i(k+1)S_i(k+1)W_i^T(k+1). \qquad (17)$$

We examine three strategies for combining the information from the other nodes:

1. The nodes are disconnected. No information flows between the nodes and the final updates are given by $$\hat{x}_i(k+1|k+1) = \hat{x}_i^*(k+1|k+1), \qquad (18)$$

$$P_i(k+1|k+1) = P_i^*(k+1|k+1). \qquad (19)$$

2. Assumed independence update. All nodes are assumed to operate independently of one another. Under this assumption, the Kalman filter update equations can be used in Step 4 of the fusion strategy described in the previous section.
3. CI-based update. The update scheme described in Section 4 is used.

The performance of each of these strategies was assessed using a Monte Carlo of 100 runs.

TABLE 2

| Node | Scheme | $\sigma_x^2$ | $\sigma_{\dot{x}}^2$ | $\sigma_{\ddot{x}}^2$ |
|---|---|---|---|---|
| 1 | NONE | 0.8823 | 8.2081 | 37.6911 |
|   | CI | 0.6055 | 0.9359 | 14.823 |
| 2 | NONE | 50.5716* | 1.6750 | 16.8829 |
|   | CI | 1.2186 | 0.2914 | 0.2945 |
| 3 | NONE | 77852.3* | 7.2649* | 0.2476 |
|   | CI | 1.5325 | 0.3033 | 0.2457 |
| 4 | NONE | 75.207* | 2.4248 | 19.473 |
|   | CI | 1.2395 | 0.3063 | 0.2952 |

The diagonal elements of the covariance matrices for each node at the end of 100 timesteps for each of the consistent distribution schemes (NONE—no distribution, and CI—the CI algorithm). A * denotes that a state is unobservable and its variance is increasing without bound.

The results from the first strategy (no data distribution) reveal, as expected, that the system behaves poorly. Because each node operates in isolation, only Node 1 (which measures x) is fully observable. The position variance increases without bound for the three remaining nodes. Similarly, the velocity is observable for Nodes 1, 2 and 4 but it is not observable for node 3.

The results if the second strategy (all nodes are assumed independent) reveal the effect of assumed independence: all of the estimates for all of the states in all of the nodes (apart from $\ddot{x}$ for node 3) are inconsistent. This clearly illustrates the problem of double counting.

Finally, the results from the CI distribution scheme reveal that, unlike the other two approaches, all the nodes are consistent and observable. Furthermore, as the results in Table 2 indicate, the steady-state covariance of all of the states in all of the nodes are smaller than those for case 1. In other words, this example shows that this data distribution scheme successfully and usefully propagates data through an apparently degenerate data network.

This simple example is intended only to demonstrate the effects of redundancy in a general data distribution network. CI is not limited in its applicability to linear, time invariant systems. Furthermore, the statistics of the noise sources do not have to be unbiased and Gaussian. Rather, they only need to obey the consistency assumptions. Extensive experiments have shown that CI can be used with large numbers of platforms with nonlinear dynamics, nonlinear sensor models, and continuously changing network topologies (i.e., dynamic comms links).[11]

2.8 The New Invention:

Incorporating Known Independent Information

CI and the Kalman filter are diametrically opposite in their treatment of covariance information: CI conservatively assumes that no estimate provides statistically independent information, and the Kalman filter assumes that every estimate provides statistically independent information. However, neither of these two extremes is representative of typical data fusion applications. This section demonstrates how the CI framework can be extended to subsume the generic CI filter and the Kalman filter and provide a completely general and optimal solution to the problem of maintaining and fusing consistent mean and covariance estimates.[12] More specifically, the present invention constitutes a method and apparatus for performing filtering or data fusion when some, but not all, error information is known or can be assumed to be statistically uncorrelated. In such cases neither a Kalman filter nor straight CI can be used to generate guaranteed consistent and accurate estimates. The following equation provides a useful interpretation of the original CI result. Specifically, the estimates $\{\bar{a}, A\}$ and $\{\bar{b}, B\}$ are represented in terms of their joint covariance:

$$\left\{ \begin{bmatrix} \bar{a} \\ \bar{b} \end{bmatrix}, \begin{bmatrix} A & P_{ab} \\ P_{ab}^T & B \end{bmatrix} \right\}, \quad (20)$$

where in most situations the cross covariance, $P_{ab}$, is unknown. The CI equations, however, support the conclusion that $$\begin{bmatrix} A & P_{ab} \\ P_{ab}^T & B \end{bmatrix} \leq \begin{bmatrix} \omega A^{-1} & 0 \\ 0 & (1-\omega)B^{-1} \end{bmatrix}^{-1} \quad (21)$$

because CI must assume a joint covariance that is conservative with respect to the true joint covariance. Evaluating the inverse of the right-hand-side (RHS) of the equation leads to the following consistent/conservative estimate for the joint system:

$$\left\{ \begin{bmatrix} \bar{a} \\ \bar{b} \end{bmatrix}, \begin{bmatrix} \frac{1}{\omega}A & 0 \\ 0 & \frac{1}{1-\omega}B \end{bmatrix} \right\}. \quad (22)$$

From this result, the following generalization of CI can be derived:[6]

[6]In the process a consistent estimate of the covariance of $\bar{a}+\bar{b}$ is also obtained, where $\bar{a}$ and $\bar{b}$ have an unknown degree of correlation, as $$\frac{1}{\omega}A + \frac{1}{1-\omega}B.$$

We refer to this operation as Covariance Addition (CA).

CI with Independent Error: Let $\bar{a}=\bar{a}_1+\bar{a}_2$ and $\bar{b}=\bar{b}_1+\bar{b}_2$, where $\bar{a}_1$ and $\bar{b}_1$ are correlated to an unknown degree, while the errors associated with $\bar{a}_2$ and $\bar{b}_2$ are completely independent of all others. Also, let the respective covariances of the components be $A_1$, $A_2$, $B_1$, and $B_2$. From the above results we can form a consistent joint system as:

$$\left\{ \begin{bmatrix} \bar{a}_1 + \bar{a}_2 \\ \bar{b}_1 + \bar{b}_2 \end{bmatrix}, \begin{bmatrix} \frac{1}{\omega}A_1 + A_2 & 0 \\ 0 & \frac{1}{1-\omega}B_1 + B_2 \end{bmatrix} \right\}. \quad (23)$$

Letting $$A = \frac{1}{\omega}A_1 + A_2 \text{ and } B = \frac{1}{1-\omega}B_1 + B_2,$$

we obtain the following generalized CI equations:

$$C = [A^{-1} + B^{-1}]^{-1} = \left[\left(\frac{1}{\omega}A_1 + A_2\right)^{-1} + \left(\frac{1}{1-\omega}B_1 + B_2\right)^{-1}\right]^{-1} \quad (24)$$

$$\bar{c} = [A^{-1}\bar{a} + B^{-1}\bar{b}]^{-1} = C\left[\left(\frac{1}{\omega}A_1 + A_2\right)^{-1}\bar{a} + \left(\frac{1}{1-\omega}B_1 + B_2\right)^{-1}\bar{b}\right], \quad (25)$$

where the known independence of the errors associated with $\bar{a}_2$ and $\bar{b}_2$ is exploited.

Although the above generalization of CI exploits available knowledge about independent error components, further exploitation is impossible because the combined covariance C is formed from both independent and correlated error components. However, CI can be generalized even further to produce and maintain separate covariance components, $C_1$ and $C_2$, reflecting the correlated and known-independent error components, respectively. This generalization is referred to as Split CI.

If we let $\tilde{a}_1$ and $\tilde{a}_2$ be the correlated and known-independent error components of $\tilde{a}$, with $\tilde{b}_1$ and $\tilde{b}_2$ similarly defined for $\tilde{b}$, then we can express the errors $\tilde{c}_1$ and $\tilde{c}_2$ in information (inverse covariance) form as:

$$C^{-1}(\tilde{c}_1+\tilde{c}_2)=A^{-1}(\tilde{a}_1+\tilde{a}_2)+B^{-1}(\tilde{b}_1+\tilde{b}_2), \quad (26)$$

from which the following can be obtained after pre-multiplying by C:

$$(\tilde{c}_1+\tilde{c}_2)=C[A^{-1}(\tilde{a}_1+\tilde{a}_2)+B^{-1}(\tilde{b}_1+\tilde{b}_2)]. \quad (27)$$

Squaring both sides, taking expectations, and collecting independent terms[7] yields:

$$C_2=(A^{-1}+B^{-1})^{-1}(A^{-1}A_2A^{-1}+B^{-1}B_2B^{-1})(A^{-1}+B^{-1})^{-1}, \quad (28)$$

where the non-independent part can be obtained simply by subtracting the above result from the overall fused covariance $C=(A^{-1}+B^{-1})^{-1}$, in other words, $$C_1=(A^{-1}+B^{-1})^{-1}-C_2. \quad (29)$$

[7]Recall that $$A = \frac{1}{\omega}A_1 + A_2 \text{ and } B = \frac{1}{1-\omega}B_1 + B_2.$$

Split CI can also be expressed in batch form analogously to the batch form of original CI[8].

[8]Note that the Covariance Addition equation can be generalized analogously to provide Split CA capabilities.

The generalized and split variants of CI optimally exploit knowledge of statistical independence. This provides an extremely general filtering, control, and data fusion framework that completely subsumes the Kalman filter.

2.8.1 Example Revisited

The contribution of generalized CI can be demonstrated by revisiting the example described in Section 2.7. The scheme described earlier attempted to exploit information which is independent in the observations. However, it failed to exploit one potentially very valuable source of information—the fact that the distributed estimates ($\hat{x}_i^*$(k+1|k+1) with co-variance $P_i^*$(k+1|k+1)) contain the observations taken at time step k+1. Under the assumption that the measurement errors are uncorrelated, generalized CI can be exploited to significantly improve the performance of the information network. The distributed estimates are split into the (possibly) correlated and known independent components and generalized CI can be used to remotely fuse the data.

The estimate of node i at time step k is maintained in split form with mean $\hat{x}_i$(k|k) and covariances $P_{i,1}$(k|k) and $P_{i,2}$(k|k). As explained below, it is not possible to ensure that $P_{i,2}$(k|k) will be independent of the distributed estimates which will be received at time step k. Therefore, the prediction step combines the the correlated and independent terms into the correlated term, and sets the independent term to 0:

$$\hat{x}_i(k+1|k)=F\hat{x}_i(k|k)$$

$$P_{i,1}(k+1|k)=F(P_{i,1}(k+1|k)+P_{i,2}(k+1|k))F^T+Q(k)$$

$$P_{i,2}(k+1|k)=0. \quad (30)$$

The process noise is treated as a correlated noise component because each sensing node is tracking the same object. Therefore, the process noise which acts on each node is perfectly correlated with the process noise acting on all other nodes.

The split form of the distributed estimate is found by applying split CI to fuse the prediction with $z_i$ (k+1). Because the prediction only contains correlated terms and the observation only contains independent terms ($A_2=0$ and $B_1$ 0 in Equation 24) the optimized solution for this update occurs when $\omega=1$. This is the same as calculating the normal Kalman filter update and explicitly partitioning the contributions of the predictions from the observations. Let $W_i^*$(k+1) be the weight used to calculate the distributed estimate. From Equation 30 its value is given by, $$S_i^*(k+1)=H_iP_{i,1}(k+1|k)H_i^T+R_i \quad (31)$$

$$W_i^*(k+1)=P_{i,1}(k+1|k)H_i^TS_i^*(k+1)^{-1}. \quad (32)$$

Taking outer products of the prediction and observation contribution terms, the correlated

TABLE 3

| Node | Scheme | $\sigma_x^2$ | $\sigma_{\dot{x}}^2$ | $\sigma_{\ddot{x}}^2$ |
|---|---|---|---|---|
| 1 | NONE | 0.8823 | 8.2081 | 37.6911 |
|   | CI | 0.6055 | 0.9359 | 14.823 |
|   | GCI | 0.4406 | 0.7874 | 13.050 |
| 2 | NONE | 50.5716* | 1.6750 | 16.8829 |
|   | CI | 1.2186 | 0.2914 | 0.2945 |
|   | GCI | 0.3603 | 0.2559 | 0.2470 |
| 3 | NONE | 77852* | 7.2649* | 0.2476 |
|   | CI | 1.5325 | 0.3033 | 0.2457 |
|   | GCI | 0.7861 | 0.2608 | 0.2453 |
| 4 | NONE | 75.207* | 2.4248 | 19.473 |
|   | CI | 1.2395 | 0.3063 | 0.2952 |
|   | GCI | 0.5785 | 0.2636 | 0.2466 |

The diagonal elements of the covariance matrices for each node at the end of 100 timesteps for each of the consistent distribution schemes (NONE—no distribution, and CI—the CI algorithm): GCI—generalized CI algorithm which is described in Section 2.8). A * denotes that a state is unobservable and its variance is increasing without bound. The covariance used for the GCI values is $P_i(k|k) = P_{i,1}(k|k) + P_{i,2}(k|k)$.

and independent terms of the distributed estimate are $$P_{i,1}^*(k+1|k+1)=X(k+1)P_i(k+1|k)X^T(k+1)$$

$$P_{i,2}^*(k+1|k+1)=W(k+1)R(k+1)W^T(k+1),$$

where $X(k+1)=I-W_i^*(k+1)H(k+1)$.

The split distributed updates are propagated to all other nodes where they are fused with spilt CI to yield a split partial estimate with mean $\hat{x}_i^+$(k+1|k+1) and covariances $P_{i,1}^+(k+1|k+1)$ and $P_{1,2}^+(k+1|k+1)$.

Split CI can now be used to incorporate z(k). However, because the observation contains no correlated terms ($B_1=0$ in Equation 24), the optimal solution is always ω=1.

The effect of this algorithm can be seen in in Table 3. As can be seen, the results of generalized CI are dramatic. The most strongly affected node is Node 2, whose position variance is reduced almost by a factor of 3. The least affected node is Node 1. This not surprising, given that Node 1 is fully observable. Even so, the variance on its position estimate is reduced by more than 25 percent.

2.9 Map Building

Many applications for mobile robots demand multi-robot systems which are capable of operating in large environments for long periods of time. One of the most critical capabilities is the ability to localize—the robot must be able to estimate its own position. However, many of these applications require that robots work in conditions (such as within city streets, under water, indoors, beneath foliage or extra-terrestrial robotic missions [13]) where GPS is not reliably available and other localization strategies must be used. One of the most powerful and flexible methods is Simultaneous Localization and Map Building (SLAM). The environment is populated by a set of landmarks or beacons. As the robot explores the environment, it constructs a map of those beacons and, at the same time, estimates its own position within the map.

The optimal solution for the SLAM problem is to combine the vehicle and beacon estimates into a single state space which is directly estimated [14]. The state of the vehicle at timestep k is $x_v(k)$ and the state of the ith beacon is $p_i(k)$. The full state space for a map of n beacons is $$x_n(k) = [x_v^T(k) p_1^T(k) \ldots p_n^T(k)]^T.$$

Using the notation that (i|j) indicates that the quantity is calculated at time i using all observations up to and including time j, the mean and covariance of the estimate are $$\hat{x}_n^T(k|k) = [\hat{x}_v^T(k|k)\ldots\hat{p}_n^T(k|k)]^T$$

$$P_n(k|k) = \begin{pmatrix} P_{vv}(k|k) & P_{v1}(k|k) & \cdots & P_{vn}(k|k) \\ P_{1v}(k|k) & P_{11}(k|k) & \cdots & P_{1n}(k|k) \\ P_{2v}(k|k) & P_{21}(k|k) & \cdots & P_{2n}(k|k) \\ \vdots & \vdots & \ddots & \vdots \\ P_{nv}(k|k) & P_{n1}(k|k) & \cdots & P_{nn}(k|k) \end{pmatrix}.$$

$P_{vv}(k|k)$ is the covariance of the robot's position estimate, $P_{ii}(k|k)$ is the covariance of the position estimate of the ith beacon and $P_{ij}(k|k)$ is the cross-correlation between the estimate of i and j. The conventional Kalman filter equations are used to update the mean and covariance of the vehicle and the map directly.

The advantage of the this algorithm is that it maintains the full correlation structure between the vehicle and the beacons. However, this algorithm has two important shortcomings. The first and best-known is that the algorithm scales extremely poorly—for a map of n beacons, both the storage and computational costs are $O(n^2)$. This means that the optimal SLAM algorithm can only be applied in real-time for relatively small maps (with only a few hundred beacons) and relatively low sensor update rates (a few tens of Hz). The second is that recent analysis has revealed that subtle linearization errors will probably cause many types of maps to diverge given that a sufficient number of beacon updates have occurred [15].

A number of authors have studied ways to reduce the scaling in the SLAM algorithm and three broadly different approaches have been identified. These can be broadly classified into those methods which retain the optimal map building structure, those which retain optimal structures but are re-formulated versions of the map building problem, and those which use suboptimal data fusion algorithms[9].

[9]Guivant has recently proposed an algorithm which spans all three of these categories [16].

Within the first approach are submaps [17] (full SLAM is applied to a small subset of beacons and the changes to all other beacons are batched up and applied at a later time) and map management schemes [18] (most of the beacons are discarded and only a minimal beacon "trail" is maintained). However, these approaches do not alter the fundamental scaling properties of the SLAM algorithm. Within the second set is the relative map frame-work [19,20] which reformulates the map in terms of the displacement between pairs or triples of beacons rather than the absolute position of each beacon. It can be shown that the scaling and computational costs vary between being linear in the number of beacons and the same as the optimal solution. However, there are two significant difficulties with this approach. First, the beacons estimate are not expressed in a single consistent coordinate frame and must be converted using projection operators [20]. Second, the map cannot be used to directly update the vehicle. The third category includes the DSM of Leonard and Feder [?]. This algorithm decomposes the map into a set of submaps the cross correlations between the submaps are not maintained and only the submap within which the vehicle is operating needs to be updated. The computational costs of this method are a function of the size of each submap. However, a heuristic algorithm is needed to propagate the vehicle estimates between submaps and it is still unclear as to the conditions under which this transformation yields a consistent estimate.

However, the fundamental scaling problem arises directly from the use of the Kalman filter [5]. The Kalman filter relies on the assumption that the correlation structure is precisely known and, if it is not, the estimate diverges. Covariance Intersection (CI) is the provably optimal update rule when no information about the cross correlations are maintained [21]. When CI is applied to the SLAM domain, the problem can be simplified to a set of n+1 independent filters—one for the vehicle and n for each of the beacons. The computational costs are constant time and the scaling is linear in the number of beacons [5, 22]. Furthermore, the algorithm can be readily used to implement distributed SLAM over multiple robots.

However, these benefits come at the cost that CI is extremely conservative in its use of information and methods are being sought which maintain information more effectively. One approach is to combine the CI algorithm with other SLAM algorithms. In [?] we showed that CI could be combined with the relative map to provide a real-time SLAM algorithm capable of performing 2,000 beacon updates/second on a map of 15,000 beacons. A second approach is to use recent extensions of CI to exploit information more effectively. One such algorithm is the Split Covariance Intersection (SCI) [23,24]. Initially developed for the distributed data fusion domain, this algorithm is capable of utilising known, independent information about sets of estimates.

In the following we develop a SLAM algorithm based on the SCI algorithm. The structure of the discussion is as follows. Section 3 introduces the split covariance intersection algorithm. The application of SCI to SLAM is described in Section 4. A simulation example is carried out in Section 2.7. This example shows that SCI is significantly better than CI. However, its performance is worse than that for full SLAM. We show that, with an orientation sensor, significant performance improvements can be made. Conclusions are given in Section 5.2.

3 Efficient and Consistent Data Fusion Algorithms

The update step fuses the observation (z(k+1) with covariance R(k+1)) with the prediction ($\hat{x}$(k+1|k) with covariance P(k+1 k)) to yield a new estimate ($\hat{x}$(k+1|k+1) with covariance P(k+1|k+1)). When the cross correlation between the prediction and the observation are perfectly known, the Kalman filter (or its extension to correlated noise terms) can be used. However, when the correlations are unknown, the Kalman filter becomes prone to divergence. Covariance Intersection (CI) is an alternative update equation which assumes that no information about the cross correlations are known. If the observation matrix is $H$[10], the CI update equation is

[10]For simplicity, this section limits the discussion to linear systems.

$$P^{-1}(k+1|k+1) = \omega P^{-1}(k+1|k) + (1-\omega)H^T(k+1)R^{-1}(k+1)H(k+1)$$

$$P^{-1}(k+1|k+1)\hat{x}(k+1|k+1) =$$
$$\omega P^{-1}(k+1|k)\hat{x}(k+1|k) + (1-\omega)H^T(k+1)R^{-1}(k+1)z(k+1).$$

It can be shown that, if $\omega$ lies in the range $0 \leq \omega \leq 1$, P(k+1|k+1) is consistent for all possible cross correlations between $\hat{x}$(k+1|k) and R(k+1). Intuitively, the role of $\omega$ is to penalise the estimate due to the lack of information about the cross-correlations. The value of $\omega$ is chosen using an optimization process so that the uncertainty of the update (such as the determinant of P(k+1|k+1)) is minimised.

The Split Covariance Intersection (SCI) algorithm [24] extends CI by allowing some information about the cross correlations to be exploited. Specifically, we assume that the error in the prediction, $\tilde{x}$(k|k), can be decomposed into two terms $$\tilde{x}(k|k) = \tilde{x}^C(k|k) + \tilde{x}^I(k|k).$$

The first term $\tilde{x}^C$(k|k) is a correlated error component whose precise correlation structure is unknown. The second term is a component which is known to be independent. The covariance of $\hat{x}$(k|k) is $$P(k|k) = P^C(k|k) + P^I(k|k).$$

It is assumed that the observation noise can be similarly decomposed into correlated and independent terms with covariances $R^C$(k+1) and $R^I$(k+1) respectively. Defining the scaled covariance terms $$P^*(k+1|k) = P^C(k+1|k) + \omega P^I(k+1|k)$$

$$R^*(k+1) = R^C(k+1) + (1-\omega)R^I(k+1),$$

the generalised covariance intersection equation [23] is[11] The SCI algorithm uses these weighted terms:

[11]This result was later independently derived by Xu in the context of SLAM using images to construct a mosaic-based map [25]. However, Xu did not employ the independent update formulation described in Equation 3.

$$P^{-1}(k+1|k+1) =$$
$$\omega P^*(k+1|k)^{-1} + (1-\omega)H^T(k+1)R^*(k+1)^{-1}H(k+1)$$

-continued
$$P^{-1}(k+1|k+1)\hat{x}(k+1|k+1) =$$
$$\omega P^*(k+1|k)^{-1}\hat{x}(k+1|k) + (1-\omega)H^T(k+1)R^*(k+1)^{-1}z(k+1).$$

In state space form this can be written as $$C^*(k+1) = \frac{1}{\omega}P^*(k+1|k)H^T(k+1) \quad (34)$$

$$S^*(k+1) = H(k+1)C^*(k) + \frac{1}{1+\omega}R^*(k+1)$$

$$W^*(k+1) = C^*(k+1)S^*(k+1)^{-1}$$

$$\hat{x}(k+1|k+1) = \hat{x}(k+1|k) + W^*(k+1)v(k+1)$$

$$P(k+1|k+1) = \frac{1}{\omega}P^*(k+1|k) - W^*(k+1)S^*(k+1)W^*(k+1)^T$$

The intuition behind this algorithm is that the $\omega$ scaling penalty is only applied to the correlated components. It can be shown that SCI is optimal given the available information and is consistent for all choices of $0 \leq \omega \leq 1$. Furthermore, as the correlated terms go to 0, SCI to the conventional Kalman filter. As the independent terms go to 0, SCI converges to the CI algorithm.

One important implication of the update equation is that it is possible, to calculate the covariances of the independent and correlated terms in the update equation. Through decomposing the estimate in this manner, SCI can be applied in subsequent time steps.

By collecting the independent error terms in Equation 34 and taking outer products, it can be shown that the independent and correlated update terms are $$P^I(k+1|k+1) = XP^I(k+1|k)X^T + W^*(k+1)R^I(k+1)W^*(k+1)^T$$

$$P^C(k+1|k+1) = P(k+1|k+1) - P^I(k+1|k+1)$$

where $\quad X = I - W^*(k+1)H(k+1).$

4 Using Split CI with SLAM

The SLAM problem naturally decomposes into independent and correlated terms. The independent terms arise from the process noise which accumulates between times when the vehicle observes beacons, and the independent observation noises arise from the beacon observations. The correlated terms arise from the vehicle-beacon cross-correlation terms which are not maintained.

The basic structure of the SCI-SLAM algorithm consists of four steps: prediction, update vehicle state, update beacon state, covariance adjustment. If multiple beacons are observed at the same time, the second and third steps are repeated for each beacon before the covariance adjustment is applied. We now discuss each of these steps in turn.

Prediction:

The predicted mean and covariance are $$\hat{x}(k+1|k) = f_v[\hat{x}(k|k), u(k), v(k)]$$

$$P^C_{vv}(k+1|k) = \nabla_x f P^C_{vv}(k|k) \nabla_x^T f$$

$$P^I_{vv}(k+1|k) = \nabla_x f P^I_{vv}(k|k) \nabla_x^T f + \nabla_v f Q^I(k+1) \nabla_v^T f$$

where it is assumed that the process noise is independent[12].

[12]If the process noise contains correlated components, these can be accounted for by using the split covariance addition algorithm [24].

Update Vehicle Estimate:

The observation model and observation model Jacobian for when the vehicle observes the ith beacon is $$z_i(k) = h_i[x_v(k), p_i(k), w(k)] \quad (35)$$

$$\nabla h_i = [\nabla h_i^x \; -\nabla h_i^p] \quad (36)$$

where $w(k)$ is the observation noise with covariance $R(k)$ and the negative sign on $\nabla h_i^P$ denotes the fact that the beacon estimates often enter with the opposite sign to the vehicle estimates.

First consider the update of the vehicle. The vehicle position is updated using the innovation vector $$v(k+1) = z(k+1) - h[\hat{x}(k+1|k), \hat{p}_i(k+1|k)].$$

Using the SCI equation, the vehicle observation matrix is $\nabla h_i^x$. The observation covariance is a function of the observation and the estimated position of the ith beacon. These two terms directly contribute towards correlated and independent observation noise components:

$$R_v^C(k+1) = \nabla_p h P_{ii}^I(k+1|k) \nabla_p^T h$$

$$R_v^I(k+1) = \nabla_p h P_{ii}^C(k+1|k) \nabla_p^T h + \nabla_w h R(k+1) \nabla_w^T h.$$

Let $\omega_v$ be the optimal value of $\omega$ used in the SCI equation and $W_v^*(k+1)$ be the update weight. The SCI update yields the new vehicle position estimate, $\hat{x}_v(k+1|k+1)$, as well as the partially updated $\overline{P}_{vv}^I(k+1|k+1)$ and $\overline{P}_{vv}^C(k+1|k+1)$. These are not the final covariances—as explained below, an adjustment step is needed to ensure that SCI can be consistently used in subsequent time steps.

Update Beacon Estimate:

The beacon is updated by effectively "adding" the observation to the vehicle prediction to give an estimate of the beacon's position. Therefore, beacon observation matrix is $\nabla h_i^P$ and the beacon's independent and correlated terms arise from the observations and the vehicle prediction:

$$R_i^C(k+1) = \nabla_p h P_{vv}^I(k+1|k) \nabla_p^T h$$

$$R_i^I(k+1) = \nabla_p h P_{vv}^C(k+1|k) \nabla_p^T h + \nabla_w h R(k+1) \nabla_w^T h$$

The optimizing value of $\omega$ is $\omega_p$ and yields the final updated mean $\hat{x}_i(k+1|k+1)$ and the partially updated covariances $$\overline{P}_{ii}^I(k+1|k+1) \text{ and } \overline{P}_{ii}^C(k+1|k+1).$$

Covariance Adjustment:

The final step is to "reassign" some of the independent terms as correlated terms. The reason for this step is that this algorithm is memoryless: it does not maintain a memory of which beacons have been recently updated by the vehicle. Therefore, to ensure that the filter does not over exploit the independent information, it is necessary to ensure that a lower bound on the independent terms can be maintained. The reassignment is as follows:

If $\omega_v = 1$ and $\omega_p = 1$, neither the vehicle nor the beacon are updated. Therefore, the correlated and independent terms remain the same. Therefore $$P_{vv}^I(k+1|k+1) = \overline{P}_{vv}^I(k+1|k+1),$$

$$P_{vv}^C(k+1|k+1) = \overline{P}_{vv}^C(k+1|k+1),$$

$$P_{ii}^I(k+1|k+1) = \overline{P}_{ii}^I(k+1|k+1),$$

$$P_{ii}^C(k+1|k+1) = \overline{P}_{ii}^C(k+1|k+1).$$

If $\omega_v = 1$ but $\omega_p < 1$, the vehicle estimate updates but the beacon estimate does not. Because the vehicle can update with the same beacon again at any time in the future, it is necessary to "reassign" all of the existing beacon independent terms as correlated terms. In other words, $$P_{vv}^I(k+1|k+1) = \overline{P}_{vv}^I(k+1|k+1) - W_v^*(k+1) R_v^I(k+1) W_v^{*T}(k+1)$$

$$P_{vv}^C(k+1|k+1) = \overline{P}_{vv}^C(k+1|k+1) + W_v^*(k+1) R_v^I(k+1) W_v^{*T}(k+1)^T$$

$$P_{ii}^I(k+1|k+1) = 0,$$

$$P_{ii}^C(k+1|k+1) = \overline{P}_{ii}^C(k+1|k+1) + \overline{P}_{ii}^I(k+1|k+1).$$

If $\omega_p = 1$ but $\omega_v < 1$, the vehicle updates but the beacon does not. All of the vehicle independent terms are reassigned as correlated terms, $$P_{vv}^I(k+1|k+1) = 0$$

$$P_{vv}^C(k+1|k+1) = \overline{P}_{vv}^I(k+1|k+1) + \overline{P}_{vv}^C(k+1|k+1)$$

$$P_{ii}^C(k+1|k+1) = \overline{P}_{ii}^C(k+1|k+1) + W^*(k+1) R_p^I(k+1) W_p^{*T}(k+1)$$

$$P_{ii}^I(k+1|k+1) = \overline{P}_{ii}^I(k+1|k+1) - W_p^*(k+1) R_i^I(k+1) W_p^{*T}(k+1)$$

If $\omega_p < 1$ and $\omega_v < 1$, both the vehicle and the beacon update. Under this situation, post update move all of the independent terms into the correlated ones.

$$P_{vv}^I(k+1|k+1) = 0,$$

$$P_{vv}^C(k+1|k+1) = \overline{P}_{vv}^I(k+1|k+1) + \overline{P}_{vv}^C(k+1|k+1),$$

$$P_{ii}^I(k+1|k+1) = 0,$$

$$P_{ii}^C(k+1|k+1) = \overline{P}_{ii}^C(k+1|k+1) + \overline{P}_{ii}^I(k+1|k+1).$$

5 EXAMPLE

This section demonstrates the performance of SCI against CI and the optimal SLAM algorithm.

The vehicle model is the standard equation for a steered bicycle [26]:

$$x_v(k+1) = \begin{pmatrix} x_v(k) + V(k+1)\Delta T \cos(\delta(k+1) + \theta_v(k)) \\ y_v(k) + V(k+1)\Delta T \sin(\delta(k+1) + \theta_v(k)) \\ \theta_v(k) + \dfrac{V(k+1)\Delta T \sin(\delta(k+1))}{B} \end{pmatrix},$$

where the timestep is $\Delta T$, the control inputs are the wheel speed $V(k+1)$ and steer angle $\delta(k+1)$ and the vehicle wheel base is $B$. The process noises are additive disturbances which act on $V(k)$ and $\delta(k)$. The standard deviations on these terms are $0.1 \text{ ms}^{-1}$ and $0.5°$.

The vehicle is mounted with a sensor which is capable of measuring the range and bearing to each beacon within a finite detection radius. The observation model is $$h_i[x_v(k), p_t(k), w(k)] = \begin{bmatrix} \sqrt{(x_i - x_v)^2 + (y_i - y_v)^2} \\ \tan^{-1}\left(\frac{y_i - y_v}{x_i - x_v}\right) - \theta_v \end{bmatrix}$$

The observation errors are assumed additive and the standard deviations are 10 cm in range and 0.5° bearing. The maximum detection range is 10 m.

In [15] it was argued that a compass is vital to a SLAM algorithm with nonlinear observations. Therefore, a compass is used. The compass provides observations once per second. The robot can detect beacons within 10 m of its current position.

The simulation scenario consists of a robot placed in the middle of a 200 m by 200 m field populated with 250 randomly placed beacons. The vehicle initially spirals out from the middle of the map until it nears the periphery, and then begins to spiral back in again. This is a challenging case for SLAM: the vehicle initially and continuously moves away from regions where it has surveyed beacons.

The resulting simulation estimates in x and θ for the full, CI and split CI SLAM algorithms at 17,883 time steps reveal that 184 beacons have been initialized and an average of 3.02 beacons were observed at each time step. The full SLAM results reveal that the position variance initially increases and decreases again. (The compass ensures that the orientation variance is bounded). The CI algorithm performs extremely well. Despite the fact that it utilises less than 1% of the storage or computational costs of the full SLAM algorithm, the 2 standard deviation bounds are less than a factor of 3 times full SLAM. The SCI SLAM algorithm shows significant improvements above the CI algorithm. The determinant of the vehicle's variance is less than half of that of the CI-based vehicle. The average reduction in beacon variance is approximately 32% which corresponds to a 17% reduction in the standard deviation in the beacon estimates.

There are several ways to expand the capabilities of this algorithm. First, the split CI algorithm can be extended so that it maintains the cross correlation between the vehicle and the beacons. This means that when the vehicle and beacon both update, the cross correlations between the "independent" terms can be precisely estimated. Although this leads to storage and computational costs greater than the linear results above, significant performance improvements can be achieved. The second extension is to use the algorithm with other SLAM algorithms such as relative map building.

5.1 CI Map Building with Relative Maps

Many of future applications for mobile robots demand multi-robot systems which are capable of operating in large environments for long periods of time. Examples include future Mars missions[13] and urban terrain reconnaissance missions[]. One of the most critical capabilities is the ability to localize—a mobile robot must be able to estimate its own position and transmit this information to other robots and control sites so that it can be used remotely. However, many of these applications require robots to work in conditions (such as within city streets, under water, indoors, beneath foliage or extra-terrestrial robotic missions) where GPS cannot be employed and other localization methods must be used. One of the most powerful and flexible methods is Simultaneous Localization and Map Building (SLAM). The environment is populated by a set of landmarks or beacons and only limited knowledge about those beacons is available. As the robot explores the environment, it constructs and refines a map of those features. At the same time it estimates its own position within the map.

However, SLAM will only be successful in these applications if it is scalable. Scalability can be considered with respect to four criteria:

1. The number of beacons. In general, as the size of the operating environment increases, the number of beacons in the map must increase as well. Large or complicated environments can contain many thousands of beacons. The computational and storage costs must be such that it is possible to implement the localization algorithm in real-time on available hardware resources.
2. The physical size of map. All sensing systems have a finite detection ranges. Therefore a robot will not be able to view the same group of beacons for all time. Rather, it will view a series of beacons, one after another and there is a tendency for the uncertainty in the beacon estimates to increase as the distance from the origin increases. Any map building algorithm must efficiently distribute information throughout the entire map to minimize this effect.
3. The mission time. If a map contains a large number of beacons, it can take a significant amount of time for the robot to simply explore its environment. Therefore, many thousands of iterations of the map building algorithm must be completed. Under such conditions, the effects of subtle theoretical (such as linearization errors in the full covariance map solution[27]) and implementation errors (for example accumulated numerical errors) become apparent.
4. The number of robots exploring the environment. When multiple robots explore the environment and exchange map data, the system becomes a distributed data fusion problem. Therefore, the computational and storage costs increase with the number or robots. However, these costs cannot rise to the point where they are prohibitively expensive.

The optimal solution for the SLAM problem is to estimate the beacons and the vehicle within a single state space[14]. However, this algorithm has a number of extremely shortcomings. The most well-known is its poor scaling with respect to the first criteria. For a map of n beacons, the storage is $O(n^2)$ and the computational costs are $O(n^3)$. Because of this strong limitation, a number of different approaches have been developed to address the scaling issue in map building. These can be broadly classified into those methods which retain the optimal map building structure, those which retain optimal structures but are re-formulated versions of the map building problem, and those which use suboptimal data fusion algorithms.

Within the first category are those methods which use careful implementation schemes or map management strategies. An example of the former is the work by Davidson, who has developed an algorithm which allows a map to be broken decomposed into a small subset of beacons. While the robot continues to observe those beacons, only those beacons need to be updated and high update rates can be achieved[17]. However, to ensure consistency of the system the algorithm "batches" all the transformations which must be applied to the rest of the system covariance matrices. This approach does not reduce either the computational and storage costs—it merely allows the system designer to determine when the full cost of the map update should occur. An example of a map management strategy is the approach by Dissanayake et al.[18]. Their algorithm rests on the intuition that it is not necessary or desirable for a robot to maintain a map of all of the beacons which it encounters. Rather, it is only necessary for the robot to maintain a subset of "important" beacons and unimportant beacons can be discussed. They provide a measure of the importance of a beacon. In a small scenario (148 beacons) they demonstrate that their algorithm need maintain less than half of the beacons with only a very small loss of localization accuracy. However, their algorithm does not address the fundamental issue that, as the map gets larger, the computational and storage costs increase nonlinearly in a non-scalable way.

The second category is to reformulate the map building problem so that it is computationally more amenable. Csorba introduced the notion of a relative map[19]. Rather than maintain an estimate of the absolute position of each beacon in a global coordinate frame, the relative map only stores information about the configuration of beacons with respect to one another. Csorba[19] used the distance between pairs of beacons and the angle subtended by three beacons as his state estimates. He showed that, providing the robot's sensor is capable of measuring the range and bearing to several beacons at the same time step (for example, using a vision sensor), it can be shown that each relative estimate can be updated independently of all other relative estimates. This leads to an algorithm which has O(n) storage and constant update time. However, this representation has a number of important limitations which restrict its practical usefulness. First, the relative map form is of limited use for path planning and coordination capabilities and most of these tasks are naturally specified in global coordinates. Newman[20] showed that relative maps can be converted to maps in global coordinates but, once this conversion has taken place, the form reduces to the conventional update problem. A second difficulty is that with this representation it is not clear how the vehicle position should be estimated. If the vehicle is simply treated as another beacon in the map, the vehicle estimate cannot exploit any geometric information built within the map. Furthermore, multiple vehicle estimates would have to be maintained.

The third category is to use suboptimal methods to decompose the system into a more tractable form. Probably the most obvious approach is to assume that all of the beacons are independent of one another and the vehicle estimate[28]. This leads to O(n) storage and constant computational costs. However, this approach contains fundamental errors—the vehicle and beacons are correlated with one another, and failing to compensate for unmodeled correlations leads to a map which is guaranteed to diverge [29].

Leonard and Feder[?] have developed a set of heuristic algorithms for partitioning a large map into several sub-maps. As a vehicle leaves a sub-map, its departing state is recorded. When the vehicle re-enters the map, its entering state is combined with the departing state. They have demonstrated the use of their algorithm in large scenarios (with thousands of beacons) as well as with real data. However, their algorithm has the inherent overhead that it is necessary to maintain several sub-maps. Rigorous solutions require that a subset of each sub-map must be updated at every time step.

Uhlmann considered the map building problem a reflection of the limitations of the fundamental update rule in the Kalman filter. The Kalman filter correctly fuses data between two estimates only if the correlations between the estimates are perfectly known. He replaced the Kalman update with the Covariance Intersection (CI) update algorithm[5]. This algorithm combines the data from the two estimates and only requires that the covariances of the estimates are known—the cross correlations between the estimates can be completely unknown. Therefore, it is only necessary to maintain the variance of the vehicle and the variance of each beacon—it is not necessary to maintain the cross correlations between the vehicle and the beacons. The resulting algorithm has O(n) storage and constant time update. A map building algorithm has been developed and it has shown promising results in several small scale scenarios [22]. CI has the further advantage that it can be directly used to develop general distributed data fusion networks. However, CI achieves its benefits through using the available information extremely conservatively. One result is that the CI map does not perform particularly well with respect to the second scalability criteria. This might suggest that the usefulness of CI is somewhat limited as a map building algorithm. However, CI has a second extremely important implication which, prior to the current invention, has not been exploited. Because CI does not rely on the cross correlations between estimates, it is feasible to run multiple map building algorithms in parallel and independently from one another. Their results can be fused together efficiently using the CI map.

In the following discussion we demonstrate how the basic CI map building algorithm can be usefully extended by augmenting it with the relative map. The resulting algorithm is extremely efficient—its storage is linear in the number of beacons and its computational costs are constant. Furthermore, we demonstrate the practicality of the algorithm over an extremely large scenario. The structure of the discussion is as follows. In Section 5.1.1 we describe both the full covariance and CI-based approaches to the SLAM problem. In Section 5.1.2 we present a method for combining the relative map with the CI-map. The resulting algorithm requires linear storage and constant time updates. Furthermore, the map possesses similar steady-state properties to the full covariance map. In Section 5.1.3 we demonstrate the use of the algorithm on an extremely large scenario of many thousands of beacons. We first illustrate the effectiveness of this approach through a small example of only 100 beacons. We then extend it to a substantial map building example of an extremely large map (>15, 000 beacons) at real-time rates (it is capable of processing more than 1000 beacon updates per second). In Section 5.1.8 we show how the CI algorithm easily facilitates flexible distributed map building architectures. Conclusions are given in Section 5.2.

5.1.1 SLAM Notation

The intent behind Simultaneous Localization and Map Building (SLAM) is that a mobile robot is released into an environment which is populated by a set of navigable landmarks or beacons. The precise number and location of the beacons are unknown. As the robot explores the environment, it constructs a map of the beacons which is used, in turn, to estimate the position of the robot with respect to its starting location. In the late 1980s it was proved that the only rigorous approach to optimal SLAM is to cast it as a joint estimation problem—a state estimator must estimate the vehicle and beacon estimates in the same state space[14]. In other words, if the state of the vehicle at time step k is $x_v(k)$ and the state of the ith beacon in the map is $p_i(k)$, the state of the system for n beacons is expressed according to the state vector:

$$x_n(k) = [x_v^T(k) p_1^T(k) \ldots p_n(k)]^T. \tag{37}$$

By assumption, all of the beacons are stationary and no process noise acts upon them. Therefore, the process model is of the form $$f[x_n(k), u(k), v(k)] = (f_v[x_v(k), u(k), v(k)]^T 0 \ldots 0) \quad (38)$$

where u(k) is the control input and v(k) is the process noise with covariance Q(k+1).

The sensor model for when the vehicle observes the ith beacon is $$z_i(k) = h_i[x_v(k), p_i(k), w(k)].$$

w(k) is the observation noise, which is assumed to be zero mean with covariance R(k).

In the following discussion we consider Kalman filter-type estimators. These propagate a mean and covariance matrix, $$\hat{x}_n(k|k) = [\hat{x}_v^T(k|k) \hat{p}_1^T(k|k) \vdots \hat{p}_n^T(k|k)] \quad (39)$$

$$P_n(k|k) = \begin{pmatrix} P_{vv}(k|k) & P_{v1}(k|k) & P_{v2}(k|k) & \ldots & P_{vn}(k|k) \\ P_{1v}(k|k) & P_{11}(k|k) & P_{12}(k|k) & \ldots & P_{1n}(k|k) \\ P_{2v}(k|k) & P_{21}(k|k) & P_{22}(k|k) & \ldots & P_{2n}(k|k) \\ \vdots & \vdots & \vdots & \ddots & \vdots \\ P_{nv}(k|k) & P_{n1}(k|k) & P_{n2}(k|k) & \cdots & P_{nn}(k|k) \end{pmatrix} \quad (40)$$

where $P_{vv}(k|k)$ is the covariance of the robot's state estimate, $P_{ii}(k|k)$ is the covariance of the position estimate of the ith beacon and $P_{ij}(k|k)$ is the cross-correlation between the estimates of beacons i and j. However, if the estimate is to remain consistent[13], it is not possible to simply assume that the cross-correlations can be set to 0 and neglected. The reason is that the cross correlations encode the degree of independent information within the map. Failure to take account of these correlations properly leads to an inconsistent map[14, 29].

[13]Suppose the estimate of the state vector x(k) is $\hat{x}(k|k)$ with covariance P(k|k). The estimate is consistent if $$P(k|k) - E[\{\hat{x}(k|k) - x(k)\}\{\hat{x}(k|k) - x(k)\}^T] \geq 0.$$

The Covariance Intersection (CI) algorithm provides a mechanism to eliminate the correlation terms in a theoretically rigorous manner[5,21]. It achieves this by replacing the conventional Kalman filter update equation (which requires that the full correlation information is known) with an update rule which only requires the mean and covariance of the estimate and the observation. The cross correlation can be completely unknown. It can be shown that, under these conditions, CI is the optimal data fusion algorithm. CI is most easily expressed in terms of the inverse-covariance or information form of the Kalman. For a linear system[14]

$$P^{-1}(k+1|k+1) = P^{-1}(k+1|k) + H^T(k+1)R^{-1}(k+1)H(k+1) \quad (41)$$

$$P^{-1}(k+1|k+1)\hat{x}(k+1|k+1) = P^{-1}(k+1|k)\hat{x}(k+1|k) + H^T(k+1)R^{-1}(k+1)z(k+1). \quad (42)$$

The CI algorithm replaces this by a convex combination of terms:

$$P^{-1}(k+1|k+1) = \omega P^{-1}(k+1|k) + (1-\omega)H^T(k+1)R^{-1}(k+1)H(k+1) \quad (43)$$

$$P^{-1}(k+1|k+1)\hat{x}(k+1|k+1) = \omega P^{-1}(k+1|k)\hat{x}(k+1|k) + (1-\omega)H^T(k+1)R^{-1}(k+1)z(k+1). \quad (44)$$

where $0 \leq \omega \leq 1$. It can be proved that $P^{-1}(k+1|k+1)$ is consistent for all values of $\omega$ in the range $0 \leq \omega \leq 1$. Because there are a family of solutions, $\omega$ is optimized such that the uncertainty (such as the determinant) of P(k+1|k+1) is minimized.

[14]The information form for a nonlinear system is complicated by the need to use an 'equivalent' observation vector[10]. For simplicity we do not discuss this case here. However, CI can be readily used with nonlinear systems using this form.

The advantage of this update rule is that the original state space is decomposed into n+1 state spaces, one for the vehicle and the remaining n states for the beacons. The update is a two-step process[30]:

1. Update the vehicle prediction with the observation and the predicted beacon position.
2. Update the beacon position using the vehicle prediction and the observation.

In each step $\omega$ is chosen to minimize the uncertainty in the vehicle and beacon respectively. However, as explained in the introduction this algorithm is not necessarily suitable for extremely large maps because it does not efficiently propagate data through the map. We now consider how it can be combined with the relative map building algorithm.

5.1.2 Fusion with Relative Maps

The relative map approach to SLAM, developed by Csorba[31] and refined by Newman[20], estimates the relative configuration between a group of beacons rather than the absolute position of each beacon. A relative beacon estimate is defined as $$p_{ij}(k) = p_j(k) - p_i(k).$$

A relative map can be maintained if it is possible to construct a direct observation of $p_{ij}(k)$ without the need to use the vehicle state or the observations of any other beacons. In other words, an observation equation of the form $$z_{ij}(k) = h_{ij}(z_i(k), z_j(k), s(k)) \quad (45)$$

where s(k) is a state vector which is independent of the vehicle or beacon states (an example of such a state is given in Section 5.1.3). If such an observation model exists, then the relative map maintains $n_r$ relative map estimates. Each map estimate is updated by its associated observation. However, as explained in the introduction, this formulation has the problem that, if the relative map estimates are combined together using the Kalman equations to yield a global map, the independent correlation structure is lost and the scaling becomes the same as the conventional map building algorithm. However, the relative map can be used to update the CI map without leading to the need to propagate this correlation information.

To use the combined CI-relative map, the relative map is implemented as described above. Therefore, it separately maintains its properties and correlation structure. The CI map is also implemented as described earlier. However, the CI map now contains an additional step which uses the relative map to update the global map.

Suppose the relative estimate $\hat{P}_{ij}(k|k)$ is to be used to update the estimate of beacons j. This is achieved by first constructing, from beacon i and the relative estimate, an estimate of the position of j:

$$\tilde{z}_j(k)\hat{p}_i(k|k) + \hat{p}_{ij}(k|k).$$

However, because the same observations can be used in both the CI and the relative maps, and because the same relative map estimate can update the same beacon multiple times, the correlations between $p_i(k|k)$ and $p_{ij}(k|k)$ are unknown. Therefore, the covariance of this estimate has to be calculated using Covariance Addition (CA). CA finds for the sum of two variables whose correlations are unknown, the minimum consistence covariance. Using CA, $$\tilde{R}_j(k) = \frac{1}{\omega} P_i(k|k) + \frac{1}{1-\omega} P_{ij}(k|k) \qquad 5$$

where $0 \leq \omega \leq 1$ is chosen to minimize the uncertainty (in this case determinant) of $\tilde{R}_j(k)$. However, because $\tilde{z}_j(k)$ is correlated with $\hat{p}_j(k|k)$, we must use CI to fuse $\tilde{z}_j(k)$ and $\hat{p}_j(k|k)$ together. Combining the CA and CI steps together, the update for beacon j is $$P_j^{-1}(k+1|k+1) = \omega_1 P_j^{-1}(k+1|k) + (1-\omega_1)\tilde{R}_j^{-1}(k)$$

$$\hat{p}_j(k|k) = P_j(k+1|k+1)(\omega_1 P^{-1}(k+1|k)\hat{p}_j(k|k-1) +$$

$$(1-\omega_1)\tilde{R}_j^{-1}(k)\tilde{z}_j(k))$$

$$\tilde{R}_j(k) = \frac{1}{\omega_2} P_i(k|k) + \frac{1}{1-\omega_2} P_i(k|k)$$

This equation must be optimized with respect to both $\omega_1$ and $\omega_2$. Although it is a multi-dimensional optimization problem, it is greatly simplified by the fact that the choice of one value does not constrain the choice of any other value.

Using the relative map introduces the property that, in the limit as $k \to \infty$, the variance on all the beacons tends to the same value. The reason is that as $k \to \infty$, $P_{ij}(k|k) \to 0$. Therefore, in the limit the mean and covariance of the projected estimate is $$z_j(k) = p_i(k|k) + p_{ij}(k|k)$$

$$\tilde{R}_j(k) = P_i(k|k).$$

In other words, this is equivalent to apply CI to fuse the estimate of beacon i directly with beacon j. This will occur for each beacon, connected with a relative estimate, throughout the map.

We now demonstrate that the CI-Relative map is efficient and can be applied to extremely large map building scenarios.

5.1.3 Example

Consider the following scenario. A mobile robot is released into a terrain which contains an unknown number of landmarks. The robot attempts to estimate its own position and orientation in a global coordinate system, (x, y, θ) as well as (x, y) position of each beacon in the same coordinate system. The purpose of this example is to demonstrate the scalability of the CI-Relative SLAM algorithm. Therefore, for the sake of simplicity we use the following idealized suite of sensors:

1. A set of encoders which measure the steer angle and wheel speed.
2. A range-bearing sensor which measures the range and bearing to a beacon within a coordinate system attached to the vehicle.
3. A sensor which is capable of measuring the orientation of the vehicle in the global coordinate frame. An ideal (unbiased) compass or a sun sensor can be assumed to be used to provide this information.

For the sake of simplicity, we assume that all beacons are uniquely identifiable and therefore it is not necessary to address the problem of gating or data association.

5.1.4 Process and Observation Models

The control input to the vehicle is the speed V and steer angle δ of the front wheel. The process model is:

$$x_v(k+1) = x_v(k) + (V(k) + v_v(k))\Delta T \cos[\theta_v(k) + \delta(k) + v_\delta(k)] \qquad (46)$$

$$y_v(k+1) = y_v(k) + (V(k) + v_v(k))\Delta T \sin[\theta_v(k) + \delta(k) + v_\delta(k)] \qquad (47)$$

$$\theta_v(k+1) = \theta_v(k) + (V(k) + v_v(k))\Delta T \frac{\sin[\delta(k) + v_\delta(k)]}{B} \qquad (48)$$

where B is the baseline of the vehicle. The process noises $v_v(k)$ and $v_\delta(k)$ are additive, zero mean Gaussian disturbances which act on the control inputs.

The compass sensor returns $z_C(k)$, the measurement of the vehicle's orientation corrupted by zero-mean observation noise $w_C(k)$ which is zero-mean with covariance $R_C(k)$:

$$z_C(k) = \theta_v(k) + w_C(k).$$

The range bearing sensor observation, $z_l(k)$, is the range and bearing to the beacon corrupted by additive observation noise:

$$z_l(k) = \begin{pmatrix} r(k) \\ \phi(k) \end{pmatrix} = \begin{pmatrix} \sqrt{\{x_p^i - x_v(k+1)\}^2 + \{y_p^i - y_v(k+1)\}^2} + \omega_r(k) \\ \omega \tan^{-1}\left(\frac{y_p^i - y_v(k+1)}{x_p^i - x_v(k+1)}\right) - \theta_v(k+1) + \omega_\phi(k). \end{pmatrix} \qquad (49)$$

5.1.5 Relative Map Integration

We define the relative map estimate to simply be the difference between the estimated position of two beacons expressed in the common coordinate system:

$$p_{ij}(k) = p_i(k) - p_j(k).$$

The reason why we use this system is because it is possible to directly estimate the orientation of the vehicle independently of the value calculated in by the CI map using only the compass and encoder data. Let the estimated orientation of the vehicle used in the relative map at time k, be $\hat{\theta}_v^r(k|k)$ with covariance $P_{\theta_v^r}(k|k)$. Suppose a compass observation becomes available at time step k. $\hat{\theta}_v^r(k|k)$ is set to equal this value:

$$\hat{\theta}_v^r(k|k) = z_C(k)$$

$$P_{\theta_v^r}^r(k|k) = R_C(k)$$

Suppose a map observation becomes available at time k+1. During the time steps k+1 to k+1, the orientation estimate is predicted using the process model:

$$\hat{\theta}_v^r(k+1|k) = \hat{\theta}_v^r(k|k) + (V(k) + v_v(k))\Delta T \frac{\sin[\delta(k) + v_\delta(k)]}{B}.$$

If a compass observation is available, this can be fused with $\hat{\theta}_v^r(k+1|k)$ using the Kalman filter update to give a new estimate. If a compass observation is not available, the estimate is assigned to the predicted value and integration continues over the next time step.

At time step k+1 we assume that the observations of beacon i and beacon j become available. The observation of the two beacons can be constructed directly from the observations and from $\hat{\theta}_v^r(k+1|k+1-1)$:

$$z_{ij}(k) = \begin{pmatrix} r_j(k+l)\cos(\phi_j(k+l) + \hat{\theta}_v^r(k+l|k+l-1)) - r_i(k+l)\cos(\phi_i(k+l) + \hat{\theta}_v^r(k+l|k+l-1)) \\ r_j(k+l)\sin(\phi_j(k+l) + \hat{\theta}_v^r(k+l|k+l-1)) - r_i(k+l)\sin(\phi_i(k+l) + \hat{\theta}_v^r(k+l|k+l-1)) \end{pmatrix}$$

The relative estimate $\hat{p}_P(ij|k+l)$ k+l−1 can be directly updated using the Kalman update equation. However, once this update has occurred, $\hat{\theta}_v^r(k+l|k+l-1)$ is now correlated with the relative estimate. One could, if necessary, maintain this correlation structure and thus form a local "sub-map". However, for the sake of scalability, we ignore all such correlations. Therefore, no further relative updates can occur until $\hat{\theta}_v^r(\cdot|\cdot)$ has been initialized with a new compass estimate.

It is also necessary to define the algorithm which will determine what relative estimates will be maintained between which beacons. For a map of n beacons up to n(n−1) relative estimates can be maintained. However, it can be shown that, in this case, the relative map is the equivalent to the full covariance map which has undergone a simple linear transformation (and so has the same computational and storage costs). To achieve linear storage costs, we decided to restrict the relative estimates so that any beacon can, at most, be associated with two relative estimates. We used the (highly arbitrary) algorithm that the decision to form a relative estimate between two beacons is solely based on the numerical ID of each beacon. Despite the fact that this is clearly highly suboptimal, the relative map still yields significant improvements

5.1.6 Small Scenario Experimental Results

We first tested the effect of using the relative map on a small scenario consisting of a small environment with a relatively sparse array of beacons. The map is 800 m per side and is populated with 20 beacons. At each time step the vehicle views an average of 3.3 beacons. The vehicle performs a series of continuous "sweeping maneuvers" in which it continually revisits earlier sections of the map.

The estimates of the vehicle position and orientation using the CI map builder reveal a strongly cyclical pattern. These are largely attributed to the path taken by the vehicle—it repeatedly enters and leaves those parts of the environment where the beacons have been well-localized. The CI estimates are consistent, but they are also have very conservative covariances. Despite the fact that the vehicle repeatedly visits the further part of the map, there is no indication that the beacons are being updated. Increasing the number of time steps does not significantly alter this behavior. The vehicle orientation estimate remains approximately constant due to the effect of the compass. The use of a relative map has a significant impact on the results.

5.1.7 Large Scenario Experimental Results

To test the scalability of the CI-Relative map, we ran the algorithm on a second, significantly larger scenario. The complete test area is a grid 70,000 units per side and contains approximately 100,000 beacons. The time required for the vehicle to explore the entire environment is extremely long. To shorten map building times, we increased the beacon density to an average of 32 beacon detections per beacon sensor time step. Here we present the results for the first 26,946,000 time steps. After 311,650 time steps the vehicle has explored a region of approximately 24,000 units per side and has currently initialized a map of 15,832 beacons.

Simulation results reveal that the vehicle estimate remains consistent and that the CI-Relative map is capable of operating for extremely long periods of time. The results also reveal that the vehicle covariance increases through time. This is not a direct result of the CI-Relative map but rather the path the vehicle is taking. The vehicle continuously moves into regions which it has not entered before (marked increase in covariance) before returning to regions that it has returned to before. If the vehicle ceased its exploration and continued to operate in the same closed region, the beacon covariance would decrease. Given this fact, the rate of increase of the covariance is surprisingly small. The $2\sigma$ bounds are less than 0.5% of the dimension of the map.

With regard to system usage, our reference implementation (written in C and running on a 333 MHz Pentium II computer) completed 27,190,000 time steps in approximately 7 hours and 43 minutes. In other words, the algorithm completed approximately 1000 updates per second. The size of the map did not make any significant difference to the update rate of the filter.

This example demonstrates that the CI-Relative map is scalable, is capable of running for extremely long periods of time and yields acceptable performance. We now discuss how the algorithm can be distributed between multiple vehicles.

5.1.8 Distributing the Algorithm to Multiple Vehicles

Suppose that a set of N robots are now cooperatively tasked in the same environment. Each robot has the capability to build its own map and to exchange information about this map with other robots. Through this exchange each robot can improve its own map and so its own localization accuracy.

This type of problem lies within the field of distributed data fusion. The optimal solution requires that the state of all the robots and all of the beacons constructed by those robots are explicitly or implicitly combined into a single, joint state space. A number of algorithms have been developed which do not require the explicit construction of such a state space[2, 10]. However, these algorithms rely on certain specific network topologies such as fully-connected (all vehicles communicate with all other vehicles for all time[]) or tree-connected (a single path exists between any two nodes and so it is possible to explicitly maintain the correlation between the information which flows along these links[2]). However, these algorithms are rigid and fragile: they rely on a fixed, unchanging communication topology and cannot contain any redundant links to support communications failures[1].

However, the CI algorithm can be easily distributed between multiple vehicles by ensuring that only the beacon estimates in absolute coordinates are propagated to one another. The reason is that CI does not rely on the cross correlations—it simply fuses estimates together. Therefore, by using the CI algorithm it is possible to have arbitrary network topologies. Suppose robot b wishes to update its estimate of beacon i using the estimate from robot a. Let the state of the ith beacon by robot a be $\hat{p}_i^a(k|k)$ and that of robot b be $\hat{p}_i^b(k|k)$. The full update step is as follows:

[15]To preserve the independent structure, the relative estimates are not distributed.

1. Robot $a$ broadcasts $\hat{p}_i^a(k|k)$ to robot $b$[15].

2. Robot $b$ applies CI to fuse $\hat{p}_i^a(k|k)$ into its estimate $\hat{p}_i^b(k|k)$.

This algorithm is extremely simple and general. The overhead from distributing the map is simply the extra work required to apply CI to each of the incoming beacon estimates. This is linear in the number of observations received from other robots. The algorithm is extremely general. As an example, robot a does not need to know which robots it has broadcast its estimates to. Nor does it have to receive a confirmation from each robot that an estimate has been successfully received and distributed. This shows that the CI algorithm can be easily extended to a distributed map building algorithm with multiple robots constructing and exchanging maps.

There is significant scope for refining this algorithm. First, because CI can be used to complement many existing map building algorithms, CI is able to exploit these developments to yield significantly more accurate maps. As an example, map management strategies can be used to attempt to identify what relative estimates should be maintained between the beacons.

5.2 Other Applications

The present invention consists of the use of Generalized CI, Split CI, Split CA, or a combination thereof to combine estimates relating to measured quantities whose degree of correlation cannot be completely determined. Example applications include:

1. Multiple model filtering—Many systems switch behaviors in a complicated manner such that a comprehensive model is difficult to derive. If multiple approximate models are available that capture different behavioral aspects with different degrees of fidelity, their estimates can be combined to achieve a better estimate. Because they are all modeling the same system, however, the different estimates are likely to be highly correlated. [32, 33]
2. Track-to-track data fusion in multiple target tracking systems—When sensor observations are made in a dense target environment, there is ambiguity concerning which tracked target produced each observation. If two tracks are determined to correspond to the same target, it assuming independence may not be possible when combining them, if they are derived from common observation information.[11, 32]
3. Nonlinear filtering—When nonlinear transformations are applied to observation estimates, correlated errors arise in the observation sequence. The same is true for time propagations of the system estimate. Covariance Intersection will ensure nondivergent nonlinear filtering if every covariance estimate is conservative. Nonlinear extensions of the Kalman filter are inherently flawed because they require independence regardless of whether or not the covariance estimates are conservative.[5, 34–39]

Current approaches to these and many other problems attempt to circumvent troublesome correlations by heuristically adding "stabilizing noise" to updated estimates to ensure that they are conservative. The amount of noise is likely to be excessive in order to guarantee that no covariance components are underestimated. Covariance Intersection ensures the best possible estimate, given the amount of information available. The most important fact that must be emphasized is that the procedure makes no assumptions about independence, nor the underlying distributions of the combined estimates. Consequently, it is likely that Covariance Intersection likely will replace the Kalman filter in a wide variety of applications where independence assumptions are unrealistic.

6 Discussion of Objects

It is an object of the present invention to provide a method and apparatus for fusing potentially correlated mean and covariance estimates so that the fused mean and covariance estimate tends to be conservative if the estimates to be fused are also conservative. It is another object of this invention that the resulting fused covariance matrix can be guaranteed to be less than or equal to, according to a particular measure of matrix size, the covariance matrix of any of the input covariances, and that the fused estimate should exploit both known independent and potentially correlated error covariance components associated with the given estimates to be fused. And it is also an object of this invention that the size of the resulting fused covariance matrix can be strictly less than the covariance matrix of any of the input estimates. No prior art provides such capabilities.

In accordance with these and other objects made apparent hereinafter, the invention is a method and apparatus for fusing signals, each of which can be represented in the form of, or converted to, a mean vector and an error covariance matrix that can be decomposed into the sum of a covariance matrix representing a lower bound on known or assumed independent error components and a covariance matrix that can be obtained by subtracting the independent error covariance from the given error covariance (thus representing a covariance estimate of error components that are potentially correlated with other estimates), in order to produce a new signal that similarly can be represented in the form of, or converted to, a mean vector and covariance matrix that may be decomposed into independent and potentially correlated error covariance components. These and other objects of the invention may be accomplished by a signal processing system comprising:

1. means for obtaining measurement estimates relating to the state of a physical system and to the error covariance of that measurement;
2. means for transforming a set of estimates to a common coordinate system;
3. means for determining (implicitly or explicitly) a weighting factor for each of a plurality of mean and split covariance estimates such that the sum of the weighting factors is one;
4. means for computing (implicitly or explicitly) a weighted combination of a plurality of mean and split covariance estimates and transmitting a signal derived from the combination; and optionally,
5. means for physically responding based on the fused signal.

These and other objects of the invention may also be accomplished by a computer readable memory, coupled with a signal processing system, wherein the memory stores instructions for configuring the signal processing system to perform a method of fusing mean and covariance estimates according to the invention.

The computer readable memory may include, but is not limited to, electromagnetic storage media and optical storage media, and the memory may be read-only or read-writable. Specific examples of computer readable memory capable of storing instructions for configuring a signal processing system according to the method of the invention include, but are not limited to, commercially available computer diskettes and hard disks, CD-ROMS, flash memory, and random access memory chips and cards.

6.1 Measurement Estimates and Transformations:

A measuring device typically generates a signal that is related according to known equations or physical laws to the state of a physical system that is measured by the device. By using the equations or physical laws, the signal produced by the measuring device may be converted into quantities representing the values of variables of interest, such as temperature or pressure, relating to the state of the system. The variables of interest can then be indexed so that they can be represented in the form of a vector wherein each element of the vector corresponds to a specific variable. The value for each variable derived from the signal produced by the measuring device can then be associated with an element of the vector corresponding to that variable. It is common for the indices of the vector to correspond to addresses of machine readable memory in which the values can be stored for manipulation by a general purpose computer.

By repeatedly measuring the state of a system whose true state is already known, it is possible to determine the actual errors in the measurements by examining the difference between each measurement vector and the vector corresponding to the true state of the system. Using standard methods, the set of measurement errors can be processed to produce a model for generating an estimated error covariance matrix for any subsequent measurement vector produced from the device. In many cases it is also possible to estimate the error covariance matrix associated with a measurement vector using known equations and physical laws that relate the measuring device and the system being measured. These and other methods for generating mean and covariance estimates from signals produced from measuring devices are well known and widely used to produce inputs for Kalman filters.

In order for a set of estimates to be fused, they must first be transformed to a common coordinate system. Methods for transforming mean and covariance estimates to a common coordinate frame, e.g., from spherical coordinate systems to a Cartesian coordinate frame, are well known and widely used to produce inputs for Kalman filters. Methods based on finite difference and the unscented transformation can be used in place of linearized (Jacobian) transformations to obtain the relevant terms in the general and split CI equations. However, it is to be understood that any mechanism that can be used to generate the necessary terms can be used with the present invention to obtain its numerous practical benefits.

6.2 The Method of the Invention:

From a set of possibly correlated estimates, all that is known is that each estimate is itself conservative, and it is possible to use CI to generate a fused estimate that is guaranteed to be conservative. However, for each estimate it is often possible to determine that some portion of its error covariance is due to a process that introduces errors that are known or can be assumed to be statistically independent of any errors in any other estimates that may be potentially fused with the given estimate. Therefore, it is possible to apply the generalizations of CI, possibly in combination with CA or its generalizations, to exploit partially known independence of errors to obtain estimates that are superior to those that can be obtained with standard CI.

6.3 An Apparatus Constituting the Invention:

The present invention includes any physical apparatus that applies a generalized variant of CI or CA to process measured information to affect the physical state of a system. A person well-versed in the use of the Kalman filter and/or CI will immediately understand how to create an apparatus based on the present invention to obtain benefits that cannot be obtained with either a Kalman filter or CI. Specifically, in contrast to a Kalman filter, the present invention guarantees that conservative estimates will produces conservative (consistent) estimates even if there are error components associated with the given estimates that are correlated to an unknown extent. In contrast to CI, the present invention can exploit the fact that some of the given estimates have error components that are, or can be assumed, statistically independent of each other.

Each of the following represents an implementation of the present invention: a tracking apparatus that uses the method of the invention to combine measurements of the changing state of one or more objects in order to accurately estimate the future state of the object or objects; an apparatus that uses the method of the present invention to combine measurements of the locations of environmental features (landmarks or beacons) to estimate the state of a vehicle so that it can be controlled accurately; a control apparatus that uses the method of the present invention to combine measurements relating to the state of a submersible, surface, air, space, or extraterrestrial vehicle and responding based on the combined/fused estimates, e.g., to affect the state of the vehicle; and a distributed sensor fusion apparatus that combines remotely obtained measurements and combines them according to the method of the present invention to produce an estimate of the state of a system in response to which a physical action can be effected. More generally, an apparatus that presently uses a Kalman filter or CI can be converted to an instance of the present invention by replacing the use of the Kalman filter or CI with one of the generalized variants of CI (or CA) described in this document as long as independent and potentially-correlated error covariance components can be determined.

6.4 Choosing the Weighting Factors:

Although the particular choice of weights in the generalized variants of CI and CA does not affect whether the resulting estimate is conservative, the choice does affect the size of the resulting covariance matrix (i.e., measure of the size of the sum of the covariance components), which determines the quality of the estimate. It is therefore preferred that the choice of weights be made so as to minimize some measure of the covariance of the resulting fused estimate. (The term "minimize" should be read to mean "approximately minimize," where the accuracy of the approximation is determined by limitations of the approach or hardware used in determining the weights.) Assigning a weighting factor of 1.0 to the estimate having the smallest covariance, and 0.0 to all other estimates, is equivalent to the trivial method of selecting the estimate with the smallest covariance to be the fused estimate. However, this choice of weights is not in general optimal according to any standard measure of covariance size.

Many common measures of the size of the combined split covariance matrices in some cases may be minimized efficiently using linear matrix inequality (LMI) and convex programming techniques. Such measures include, but are not limited to, the weighted Lp norms, trace, determinant, and weighted sum eigenvalues (or logarithms of eigenvalues). Standard mathematical optimization methods such as simulated annealing and the simplex method can also be applied to generate the set of weights. These methods can be applied in a straightforward manner according to procedures described in texts such as Numerical Recipes in C.

In some applications it is preferred to minimize a sub-block of the covariance matrix of the fused estimate. For example, in a missile tracking application that maintains a state estimate consisting of position, velocity, and temperature of a missile, it may be desirable to determine weighting factors to minimize the sub-block of the covariance representing the covariance of the speed and velocity variables, but not the relatively unimportant temperature variable. Determining weighting factors in this way ensures that the accuracy of the critical position and velocity estimates is not degraded in an (implicit) attempt to maintain an accurate estimate of temperature.

Other covariance measures can also be minimized efficiently, but brute force methods can always be applied to minimize any choice of measure. For example, it is possible to use a pseudo-random number generator to produce a set of pseudo-random numbers, then divide each number by the sum of the set of numbers so that the resulting set sums to one, and then determine the estimate resulting from the use of the set of numbers as weights according to the invention. Repeating the process for a large number of sets of weights and then selecting the set of weights producing the estimate with the smallest covariance, according to the chosen measure, will tend to produce improved estimates as the number of sets is increased. General optimization methods based on simulated annealing and genetic algorithms can also be applied to generate the set of weights when brute force approaches are not practical.

6.5 Summary of Invention and Important Note:

Once a set of weights has been determined, the fused estimate can be produced according to the invention. The fused estimate then can be transmitted for subsequent signal processing, which could include transformations before reaching, e.g., a steering controller, a display device, a storage device, or back to the invention by way of a feedback loop. If a feedback loop exists, then a given estimate may be fused multiple times with other estimates before ultimately being received by a control device, a display device, or some other physical device that is affected by the signal.

A point that is critical to emphasize is that the invention has been described in mathematical notation that is convenient for understanding and expressing the method. However, it is straightforward for a person versed in the field to transform the data fusion equations of the invention to an alternative, but functionally equivalent, form. For example, it is straightforward to algebraically manipulate the data fusion equations of the invention to a form that might be implemented differently on a computer, but implicitly performs the same method, e.g., analogous to the way that a method containing a step that computes $x*(y+z)$ would be the same method as one that computes $(x*y+x*z)$ for the step. The inverse form of the Kalman update equation is a perfect example: The inverse form of the Kalman update equation is obtained algebraically from the standard Kalman update equation, but it performs the same method. Other common transformations of filtering methods involve the use of square roots of parameters and matrices in order to enforce positivity constraints and reduce roundoff errors in various calculations. When applied to the Kalman filter, these transformations yield the so-called square root Kalman filter and the inverse square root Kalman filter.

Numerous identities are provided in filtering, control, and matrix analysis texts for reformulating vector and matrix expressions in order to reduce the number of calculations required to evaluate an expression on a computer, to improve the numerical properties of the expression when evaluated on a finite word-length computer, or to facilitate the simultaneous evaluation of components of the expression on multiple computer processors.

It is straightforward for someone knowledgeable in the field to apply one or more of these identities and related transformations to the present invention to achieve various specialized improvements.

7 BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 4A:
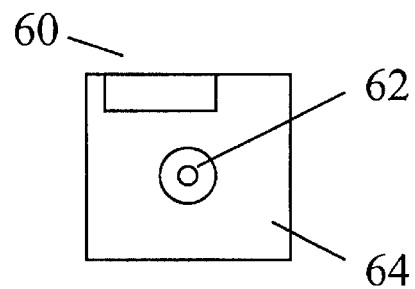
Figure 4B:
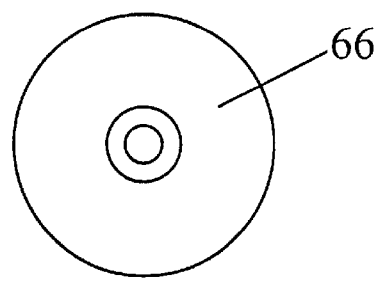
Figure 4C:
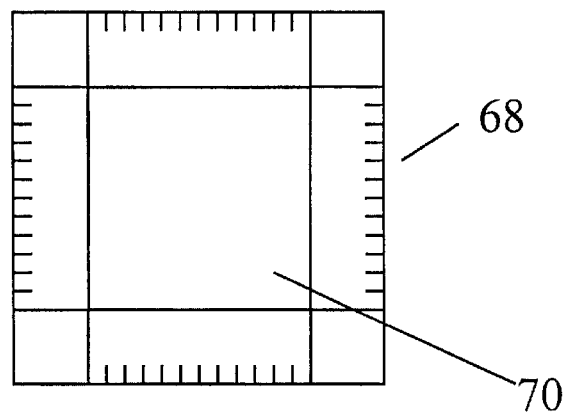

FIGS. 4a, 4b, and 4c show computer readable memory media capable of storing instructions for configuring a computer, coupled with means for obtaining mean and covariance information derived from measurements made by a physical measuring device, to perform a method of the invention. FIG. 4a shows a typical example of a computer readable memory that stores instructions on a magnetic media. FIG. 4b shows a typical example of a computer readable memory that stores instructions on an optical media. And FIG. 4c shows a typical example of a computer readable memory that stores instructions electronically. The computer readable memory media of FIGS. 4a, 4b, and 4c are also capable of storing instructions for controlling a mechanism that is able to physically respond based on a fused estimate.

8 DETAILED DESCRIPTION OF THE PREFERRED EMBODIMENTS

Figure 1:
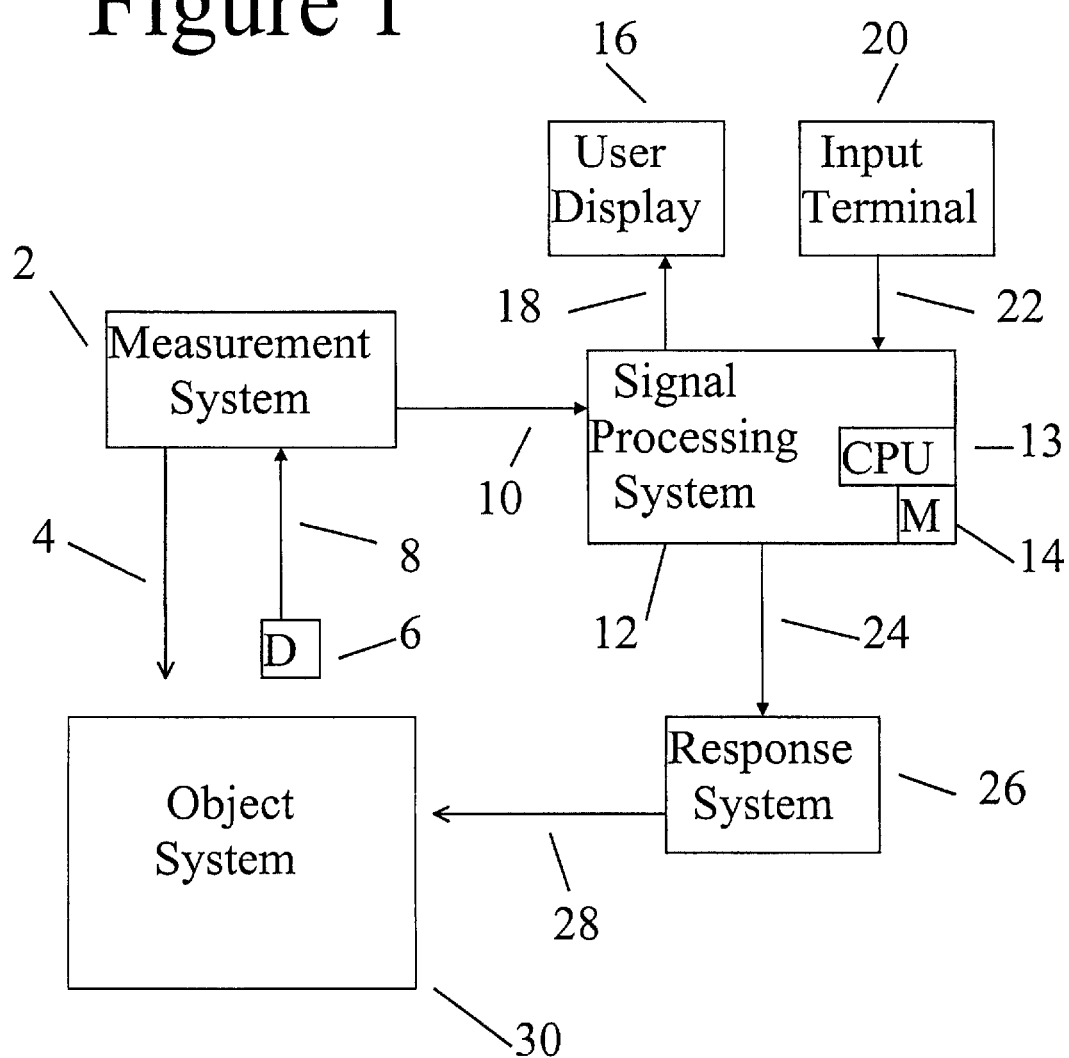
FIG. 1 is a block diagram of a signal processing system programmed or hardwired to perform a signal processing method according to the present invention.

Embodiments of the present invention relating to autonomous vehicles and SLAM have already been discussed. Other embodiments relating to nonlinear filtering, track-to-track data fusion, multiple-model filtering, and general decentralized data fusion applications have also been discussed. Various other objects, features, and attendant advantages of the present invention will be more fully appreciated as the same becomes better understood from the following detailed description when considered in connection with the accompanying drawings in which like reference characters designate like or corresponding parts, wherein:

FIG. 1 shows a block diagram of an engineering system according to the invention which includes a measurement system 2 for measuring properties of an object system 30. The measurement system 2 includes a probe signal source 4 of probe signals for probing the state of the object system 30. It should be understood that the probe signal source 4 may include multiple remotely located devices, each capable of generating a distinct signal.

A detector 6 detects a signal from the object system 30 that contains information about the state of the object system 30. The detector 6 may include multiple remotely located devices, each of which may be capable of detecting a distinct signal. A connector 8 connects the detector 6 to the measurement system 2 for transmitting a signal corresponding to the signal detected by the detector 6. It should be understood that the connector 8 may include a combination of wires, radio links, and other communications media.

A connector 10 connects the measurement system 2 to a signal processing system 12 for transmitting a signal corresponding to the signal received by the detector 6 to the signal processing system 12. It should be understood that the connector 10, like the connector 8 and all connectors referred to hereafter, may include a combination of wires, radio links, and other communications media.

The signal processing system 12 includes a central processing unit or CPU 13 for performing operations on signals received from the measurement system 2 via the connector 10 in order to process those signals. The CPU 13 may be, but is not restricted to being, a single general purpose computing device such as a microprocessor, a collection of computing devices for parallel processing of information, or an analog computing device. The signal processing system 12 also includes a machine readable memory 14 for storing inter alia the signals received from the measurement system 2, intermediate and final results of processing by the CPU 13, and instructions for controlling the CPU 13. The machine readable memory 14 may consist of a combination of magnetic and optical storage media and may be a combination of read-only and read-writable implementations.

A set of instructions for performing a method of fusing signals, each signal of which can be represented as a mean and covariance or in split form, received via the connector 10, or from the machine readable memory 14 containing previously processed signals, may be stored in the machine readable memory 14. (Flow charts for implementing the method of fusing signals are shown FIG. 2 and FIG. 3.)

A connector 18 connects the signal processing system 12 to a user display 16 for transmitting display data to the user display 16. The user display 16 may be used to display the signals received by the signal processing system 12 from the measurement system 2 and the results of the processing of those signals by the signal processing system 12.

A connector 22 connects an input terminal 20 to the signal processing system 12 for transmitting input data from the input terminal 20 to the signal processing system 12 for exerting control over the operations performed by the signal processing system 12. The input terminal 20 may be a keyboard, mouse, or other device for transmitting information from a human. The input terminal 20 may be used to control and/or reprogram the signal processing system 12 to perform a desired function.

It should be understood that the user display 16 and connector 18, as well as the input terminal 20 and the connector 22, may not necessarily be present during the processing of signals. If the instructions for controlling the signal processing system 12 are created on a remote system and subsequently transferred to the signal processing system 12 via a connector or portable storage media (thus constituting the connector 22), then the remote system represents the input terminal 20. Similarly, if the results of signal processing are subsequently transferred to a remote display via a connector or portable storage media (thus constituting the connector 18), then the remote display represents the user display 16. A connector 24 connects the signal processing system 12 to a response system 26 for transmitting signals to the response system 26. The response system 26 responds to the signals received from the signal processing system 12 via connector 24 to perform a function that is affected by the state of the object system 30, as that state is determined by the signal processing system 12. The physical response of the response system 26 may affect the state of the object system 30.

When the system envisioned in FIG. 1 corresponds to a missile defense system, the measurement system 2 is a collection of remotely located radar systems, each having a device for producing radar signals, corresponding to part of the signal source 4, and an antenna for receiving radar signals corresponding to part of the detector 6. The region within which missiles may be detected corresponds to the object system 30, and a suite of anti-missile weapons corresponds to the response system 26.

In the missile defense system embodiment of the invention, the signal processing system 12 of FIG. 1 receives mean and covariance measurement estimates via connector 10 that relate to the position of a detected missile. The signal processing system 12 produces a fused mean and covariance estimate from the union of the set of measurement estimates of the position of the detected missile and a set of estimates maintained in machine readable memory 14 generated from previously received measurement estimates. The fused estimate is then transmitted via the connector 24 to the response system 26. The response system 26 responds to the fused estimate by generating a response, corresponding to response 28, consisting of the deployment of an anti-missile weapon in a direction that is determined as a function of the fused mean position estimate.

In an industrial plant embodiment of the invention, the state of a chemical process is measured by a plurality of sensors corresponding to measurement system 2. The signal processing system 12 receives the set of measurement estimates via the connector 10 and fuses them into a single estimate according to the invention. The fused estimate is transmitted via connector 24 to the response system 26 for controlling the process. The response system 26 may, for example, generate a response signal 28 for controlling the rate of reaction in the chemical process. In the event that the response system 26 indicates a dangerous condition, it controls an alarm to indicate that personnel should evacuate areas adjacent to the chemical process.

Figure 2:
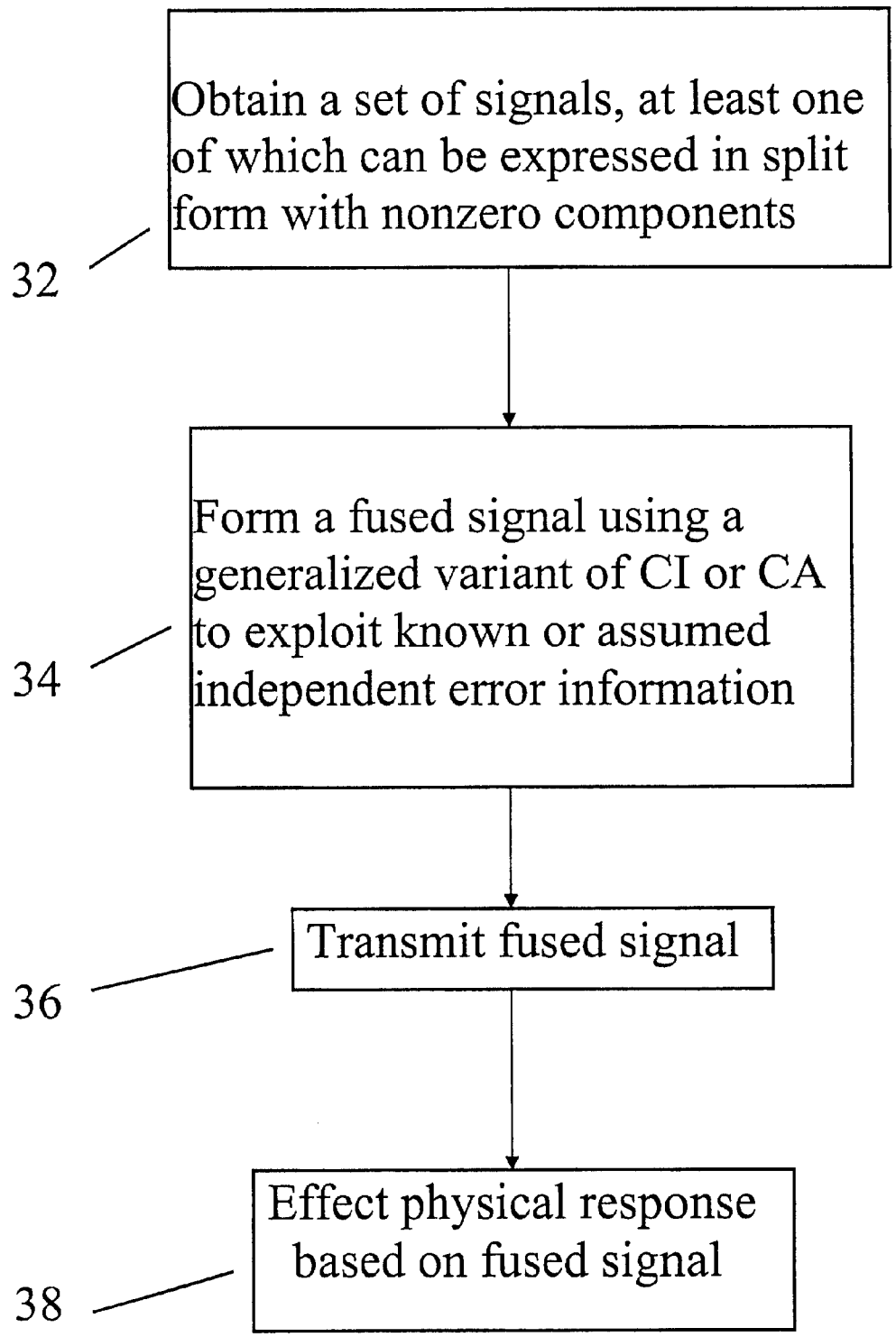
FIG. 2 is a flow chart showing the logical steps that a signal processing system performs when performing the signal processing method according to the present invention.

FIG. 2 is a flow chart showing the logical steps of the method of the present invention. The system of FIG. 1 is a physical apparatus for performing this method. Referring to FIG. 2, Step 32 obtains a set of signals corresponding to mean and covariance estimates determined according to the particular coordinate system selected by the implementor. (A particular signal may be obtained from the output of a measurement system such as measurement system 2 of FIG. 1, or it may be a previously processed signal, e.g., as stored in memory 14 of FIG. 1.) The set of signals could include measurement signals received directly from physical measuring devices, signals encoding estimates of the physical system derived from known physical laws, and signals encoding information resulting from the fusion of previously obtained estimates. One or more of the signals may encode some information derived from measurements of the physical system, and every signal should encode sufficient information to obtain a mean estimate of the state of the physical system and an estimate of the covariance components of that estimated state.

Step 34 forms a fused signal using a generalized variant of CI and/or CA from the estimates of Step 32. Step 34 may be implemented using any one of various equivalent mathematical formulations of the defined fused estimate on a general purpose computer, parallel processing computer, or analog computer. (A specific implementation of Step 34 is provided in Steps 46, 48, and 50 of FIG. 3.) It is preferred that the formed signal should be formed to minimize a chosen measure of covariance size.

Step 36 transmits the signal to a physical device such as the response system 26 of FIG. 1. The transmitted signal may encode the mean and covariance information by varying the amplitude or frequency of an electronic or electromagnetic energy source. In some cases it is preferred that the transmitted signal only encode the mean vector c, which is a function of both c and C, but to not transmit the error matrix C. This is typical when the physical response based on the signal involves pointing a sensor or weapon in a particular direction but makes no use of covariance information.

Step 38 of FIG. 2 effects a physical response based on the signal transmitted in Step 36. For example, the set of physical responses for controlling a sensor may include turning on the sensor, maintaining the current orientation of the sensor, and re-orienting the sensor to maximize the likelihood of detecting a target of interest. If the covariance of the position estimate of a target is large, then it may be advantageous to scan a region around the estimated position such that the size of the region is a function of the size of the covariance. In such a case Step 38 would cause the sensor to perform the scanning operation.

In one embodiment of the method shown in FIG. 2, the set of signals of Step 32 consists precisely of one newly received measurement of the state of the physical system of interest, such as the position and velocity of a vehicle, and one previously transmitted signal representing the current best estimate of the state of the physical system. The fused signal produced in Step 34 then becomes the new current best estimate of the state of the physical system and is transmitted (Step 36) via a feedback loop for the next execution of Step 32 and to a response system capable of producing a physical response (Step 38), such as steering a vehicle, based on the transmitted signal.

In another embodiment of the method shown in FIG. 2, the set of signals obtained in Step 32 are received from nodes in a decentralized data processing network. The fused signal of Step 34 is then transmitted (Step 36) to one or more nodes in the network. The physical response of Step 38 based on the signal of Step 34 may occur after the signal has been subsequently processed by one or more nodes in the network. The physical response in such a system could include the pointing of a sensor in the direction of the fused estimate position.

Figure 3:
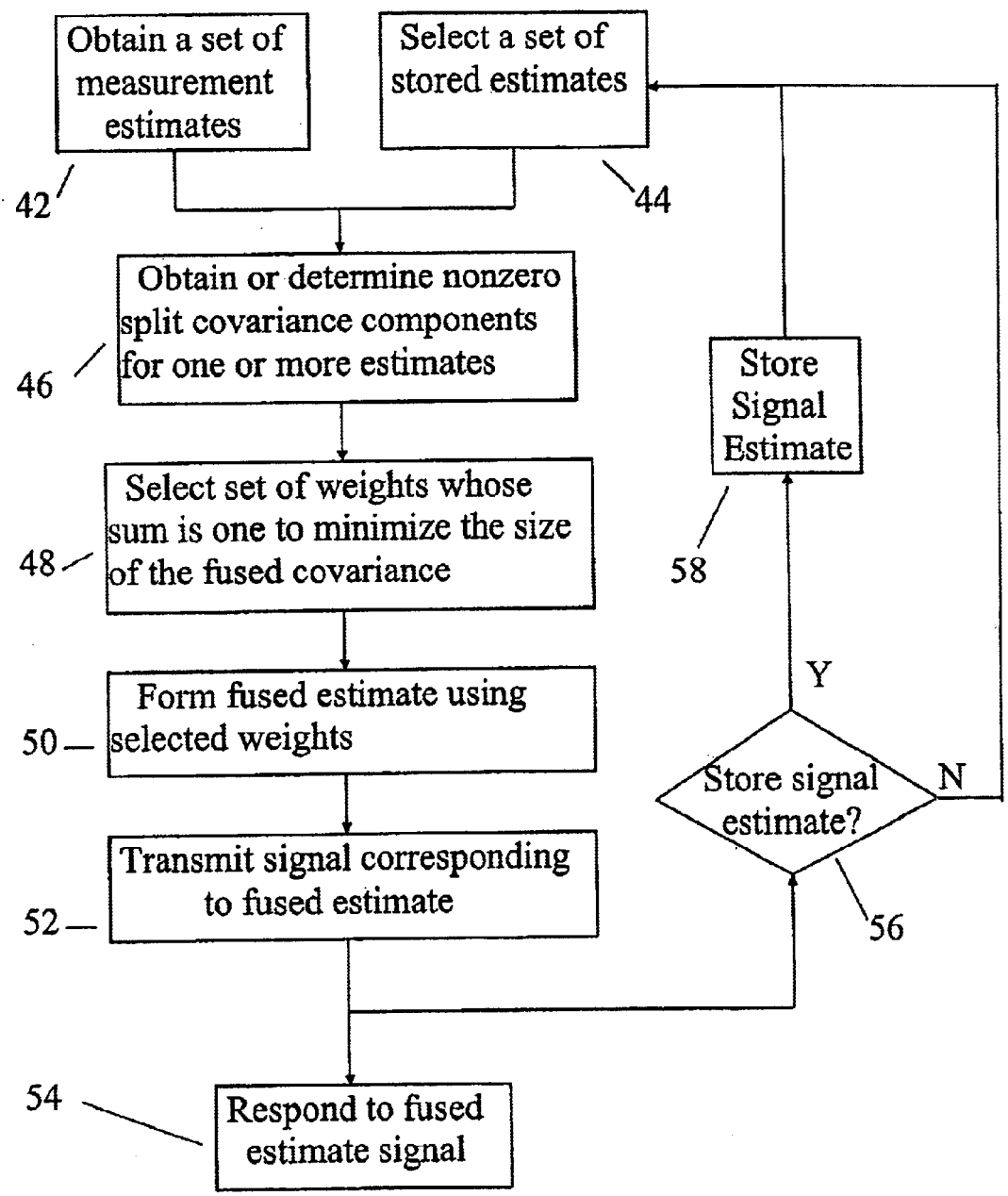
FIG. 3 is a flow chart showing the logical steps of a particular implementation of the signal processing method according to the present invention.

FIG. 3 is a flow chart showing the logical steps for a particular implementation of the method of the present invention. Steps 42 and 44 construct a set of estimates obtained by unioning a set of received measurement estimates and a set of stored estimates derived from previously received measurements. Step 46 obtains or determines the independent and non-independent error covariance components. This may be achieved by receiving the estimates in split form directly or by determining by other means a lower bound on the independent error covariance component from which implicitly determines the non-independent covariance component. Step 48 associates a weight factor to each element of the set of estimates such that the weights sum to one. It is preferred that the choice of weight factors results in an estimate that minimizes a chosen measure of covariance size. Step 50 computes a weighted sum of the estimates by summing the vector components of the estimates, each multiplied by its corresponding weight factor, and summing the matrix components of the estimates, each multiplied by its corresponding weight factor.

Step 52 transmits a signal derived from the fused estimate produced in step 50. A typical derived signal is one in standard, non-split, mean and covariance form (i.e., the independent and non-independent covariance components are summed to produce a standard conservative error covariance matrix). Step 56 determines whether the transmitted fused estimate signal is stored (step 58) in computer readable memory for possible subsequent processing. Step 54 effects a physical response based on the signal transmitted in step 52.

FIG. 4a shows a particular type of magnetic disk computer readable memory for storing instructions for controlling a computer, coupled with means for obtaining mean and covariance information derived from measurements from physical measuring devices, to form a fused estimate according to a method of the invention. An access slot 60 provides an opening through a disk cover 64 by which a reading device may access the annular disk having a central hole 62 accessible through the disk cover 64.

FIG. 4b shows a particular type of optical computer readable memory for storing instructions for controlling a computer, coupled with means for obtaining mean and covariance information derived from measurements from physical measuring devices, to form a fused estimate according to a method of the invention. The optically active surface 66 stores the instructions in a form that can be read by a light emitting reading device such as a laser.

FIG. 4c shows a particular type of electronic computer readable memory for storing instructions for controlling a computer, coupled with means for obtaining mean and covariance information derived from measurements from physical measuring devices, to form a fused estimate according to a method of the invention. The connecting pins 68 provide access to instructions stored in electronic form in a memory board 70.

8.1 Implicit Preferred Embodiments

The particulars of the above-specified preferred embodiments should not be regarded as representing limitations of the present invention. The particulars of the embodiments, e.g., the type of measurement system, the type of object system, the type of response, etc., can be adapted to well-known applications according to standard engineering practice. It should be understood that the present invention includes through implicit enumeration all embodiments obtained by applying the methods described in this document with different combinations of particular measurement devices, signal processing systems, and object systems. It should also be understood that a computer readable memory for storing instructions for controlling a computer according to one of the implicitly enumerated methods of the present invention represents an instance of the present invention.

REFERENCES

[1] Simukai W. Utete. *Network Management in Decentralised Sensing Systems*. PhD thesis, Robotics Research Group, Department of Engineering Science, University of Oxford, January 1995.

[2] S. Grime and H. F. Durrant-Whyte. Data Fusion in Decentralized Sensor Fusion Networks. *Control Engineering Practice*, 2(5):849–863, 1994.

[3] C. Chong, S. Mori, and K. Chan. Distributed multitarget multisensor tracking. In *Multitarget Multisensor Tracking*. Artech House, 1990.

[4] A. H. Jazwinski. *Stochastic Processes and Filtering Theory*. Academic Press, 1970.

[5] J. K. Uhlmann. *Dynamic Map Building and Localization: New Theoretical Foundations*. PhD thesis, University of Oxford, 1995.

[6] L. Vandenberghe and S. Boyd. Semidefinite programming. *SIAM Review*, March 1996.

[7] S.-P. Wu, L. Vandenberghe, and S. Boyd. Maxdet: Software for determinant maximization problems, alpha version. Stanford University, April 1996.

[8] S. Boyd and S. Wu. SDPSOL: *User's Guide*, November 1995. SDPSOL: A Parser/Solver for Semidefinite Programs with Matrix Structure.

[9] Y. Bar-Shalom and T. E. Fortmann. *Tracking and Data Association*. The Academic Press, 1988.

[10] A. G. O. Mutambara. *Decentralized Estimation and Control for Nonlinear Systems*. CRC Press, 1998.

[11] D. Nicholson and R. Deaves. Decentralized track fusion in dynamic networks. In *Proceedings of the 2000 SPIE Aerosense Conference*, 2000.

[12] S. J. Julier and J. K. Uhlmann. Generalized and Split Covariance Intersection and Addition. Technology Disclosure Report, Naval Research Laboratory, June 1998.

[13] E. T. Baumgartner. In-situ exploration of Mars using rover systems. In *Proceedings of the AIAA Space 2000 Conference*, Long Beach, Calif., September 2000.

[14] R. Smith, M. Self and P. Cheeseman. *Estimating Uncertain Spatial Relationships in Robotics, Autonomous Robot Vehicles*. Springer-Verlag, 1989.

[15] S. J. Julier and J. K. Uhlmann. A Counter Example to the Theory of Simultaneous Localization and Map Building. To be presented at ICRA 2001, 2001.

[16] J. Guivant, E. Nebot and H. Durrant-Whyte. Simultaneous Localization and Map Building Using Natural Features in Outdoor Environments. Journal not given, 2000.

[17] A. Davidson. *Mobile Robot Navigation Using Active Vision*. PhD thesis, University of Oxford, 1999.

[18] M. W. M. G Dissanayake, P. Newman et al. An Experimental and Theoretical Investigation into the Simultaneous Localisation and Map Building Problem. In *Proceedings of thee IEEE International Conference on Robotics and Automation*, pages 1009–1014, April 2000.

[19] M. Csorba and H. F. Durrant-Whyte. New Approach to Map Building Using Relative Position Estimates. In *Proceedings of the SPIE AeroSense Conference*, Orlando, Fla., volume 3087, pages 115–125, April 1997.

[20] P. Newman. *On the Structure and Solution of the Simultaneous Localisation and Map Building Problem*. PhD thesis, University of Sydney, 1999.

[21] S. J. Julier and J. K. Uhlmann. A Non-divergent Estimation Algorithm in the Presence of Unknown Correlations. In *American Control Conference*, Albuquerque, N. Mex., 1997.

[22] J. K. Uhlmann, S. J. Julier and M. Csorba. Nondivergent Simultaneous Map Building and Localisation using Covariance Intersection. In *The Proceedings of the SPIE AeroSense Conference: Navigation and Control Technologies for Unmanned Systems* II, volume 3087, pages 2–11. SPIE, 1997.

[23] S. J. Julier and J. K. Uhlmann. Generalizations of covariance intersection. Internal Report, 1998.

[24] S. J. Julier and J. K. Uhlmann. General Decentralized Data Fusion With Covariance Intersection (CI). In D. Hall and J. Llinas, editor, *Handbook of Data Fusion*, Boca Raton Fla., USA, 2001. CRC Press.

[25] X. Xu. *Vision-Based ROV System*. PhD thesis, University of Miami, May 2000.

[26] H. F. Durrant-Whyte. An autonomous guided vehicle for cargo handling applications. *International Journal of Robotics Research*, 15(5):407–440, October 1996.

[27] S. J. Julier. The Scaled Unscented Transformation. Submitted to *Automatica*, 2000.

[28] C. G. Harris. Tracking With Rigid Models. In A. Blake and A. Yuille, editor, *Active Vision*, Cambridge Mass., USA, 1992. MIT Press.

[29] J. A. Castellanos, J. D. Tardós and G. Schmidt. Building a Global Map of the Environment of a Mobile Robot: The Importance of Correlations. In Proceedings of 1997 IEEE Conference on Robotics and Automation, pages 1053–1059. IEEE Press, April 1997.

[30] J. K. Uhlmann. General Data Fusion for Estimates with Unknown Cross Covariances. In *Proceedings of the SPIE AeroSense Conference*, Orlando, Fla., 1996.

[31] M. Csorba. *Simultaneous Localisation and Map Building*. PhD thesis, University of Oxford, 1997.

[32] Y. Bar-Shalom and X. Li. *Multitarget-Multisensor Tracking: Principles and Techniques*. YBS Press, 1995.

[33] S. J. Julier and H. F. Durrant-Whyte. A horizontal model fusion paradigm. *Proceedings of the SPIE Aerosense Conference*, 1996.

[34] S. J. Julier, J. K. Uhlmann and H. F. Durrant-Whyte. A New Approach for the Nonlinear Transformation of Means and Covariances in Linear Filters. *IEEE Transactions on Automatic Control*, pages 477–482, March 2000.

[35] S. J. Julier, J. K. Uhlmann and H. F. Durrant-Whyte. A New Approach for Filtering Nonlinear Systems. In *The Proceedings of the American Control Conference*, Seattle, Wash., pages 1628–1632, 1995.

[36] S. J. Julier and J. K. Uhlmann. A New Extension of the Kalman Filter to Nonlinear Systems. In *The Proceedings of AeroSense: The 11th International Symposium on Aerospace/Defense Sensing, Simulation and Controls*, Orlando, Fla. SPIE, 1997. Multi Sensor Fusion, Tracking and Resource Management II.

[37] S. J. Julier and J. K. Uhlmann. A Consistent, Debiased Method for Converting Between Polar and Cartesian Coordinate Systems. In *The Proceedings of AeroSense: The 11th International Symposium on Aerospace/Defense Sensing, Simulation and Controls*, Orlando, Florida. SPIE, 1997. Acquisition, Tracking and Pointing XI.

[38] S. J. Julier. A Skewed Approach to Filtering. In *The Proceedings of AeroSense: The 12th International Symposium on Aerospace/Defense Sensing, Simulation and Controls*, Orlando, Fla. SPIE, 1998. Signal and Data Processing of Small Targets.

[39] S. J. Julier and J. K. Uhlmann. A General Method for Approximating Nonlinear Transformations of Probability Distributions. Can be downloaded from http://www.robots.ox.ac.uk/siju, August 1994.

What is claimed as new and desired to be secured by Letters Patent of the United States is:

1. A method for producing a fused signal from a set of n>1 signals, each element i, $1 \leq i \leq n$, of which contains information defining a vector $a_i$ representing the estimated mean state of a physical system and a covariance matrix $A_i =$ $$A_i = \frac{1}{\omega_i} A_{i1} + A_{i2}$$

that represents a consistent estimate of the squared error associated with the said vector for any value of $\omega_i$ between 0 and 1, inclusive, where the covariance matrix $A_{i2}$ underestimates the expected squared error in the said vector that is known to be statistically independent of the errors in the remaining n−1 signals, comprising:

forming a fused signal that can be represented as a mean vector c and covariance C defined mathematically by:

$$C^{-1} = \sum_{i=1}^{n} H_i^T \left( \frac{1}{\omega_i} A_{i1} + A_{i2} \right)^{-1} H$$

$$c = C \sum_{i=1}^{n} H_i^T \left( \frac{1}{\omega_i} A_{i1} + A_{i2} \right)^{-1} a_i$$

where any summand of the above summations containing $\omega_i = 0$ is defined to be zero and each matrix $H_i$ defines the transformation from the coordinate frame of signal i to the coordinate frame of the fused signal, and the set of real-valued numbers, $\omega_1, \ldots, \omega_n$, sum to one and are computed using an optimization algorithm to minimize some measure of the size of the fused covariance matrix C;

transmitting a signal derived from the fused signal.

2. The method of claim 1 wherein said n is equal to 2 and the fused signal is augmented to include split covariance information in which the independent error covariance component $C_2$ is defined mathematically as:

$$C_2 = C^{-1}(A_1^{-1} A_{12} A_1^{-1} + A_2^{-1} A_{22} A_2^{-1}) C^{-1}$$

where $$A_1 = \frac{1}{\omega_1} A_{11} + A_{12}$$

corresponds to the covariance of the first signal and $$A_2 = \frac{1}{\omega_2} A_{21} + A_{22}$$

corresponds to the covariance of the second signal, and $C_2$ is implicitly determined to be $C-C_1$.

3. The method of claim 2 in which $\omega_1$ and $\omega_2$ are selected so that said covariance matrix C or a sub-block of C is of minimum size according elements of the set of measures that includes the determinant, trace, weighted Lp norms, and maximum eigenvalue.

4. The method of claim 2 wherein the fused signal relates to the state of a moving platform, and one or more of said signals relate to measurements of previously mapped beacons.

5. The method of claim 1 in which said numbers, $\omega_1 \ldots, \omega_n$, are selected so that said covariance matrix C or a sub-block of C is of minimum size according elements of the set of measures that includes the determinant, trace, weighted Lp norms, and maximum eigenvalue.

6. The method of claim 1 wherein the fused signal relates to the state of a moving platform, and one or more of said signals relate to measurements of previously mapped beacons.

7. A computer-readable memory storing instructions for configuring a signal processing system, coupled with means for transmitting a signal and with means for obtaining a set of n>1 signals containing information obtained in part from a physical measuring device, each element i, $1 \leq i \leq n$, of which contains information defining a vector $a_i$ representing the estimated mean state of a physical system and a covariance matrix $$A_i = \frac{1}{\omega_i} A_{i1} + A_{i2}$$

that represents a consistent estimate of the squared error associated with the said vector for any value of $\omega_i$ between 0 and 1, inclusive, where the covariance matrix $A_{i,2}$ underestimates the expected squared error in the said vector that is known to be statistically independent of the errors in the remaining n−1 signals, to perform a method for producing a fused signal comprising:

forming a fused signal that can be represented as a mean vector c and covariance C defined mathematically by:

$$C^{-1} = \sum_{i=1}^{n} H_i^T \left( \frac{1}{\omega_i} A_{i1} + A_{i2} \right)^{-1} H$$

$$c = C \sum_{i=1}^{n} H_i^T \left( \frac{1}{\omega_i} A_{i1} + A_{i2} \right)^{-1} a_i$$

where any summand of the above summations containing $\omega_i=0$ is defined to be zero and each matrix Hi defines the transformation from the coordinate frame of signal i to the coordinate frame of the fused signal, and the set of real-valued numbers, $\omega_1, \ldots, \omega_n$: sum to one and are computed using an optimization algorithm to minimize some measure of the size of the fused covariance matrix C;

transmitting a signal derived from the fused signal.

8. The computer-readable memory of claim 7 including instructions for the case in which said n is equal to 2 for computing a fused signal that is augmented to include split covariance information in which the independent error covariance component $C_2$ is defined mathematically as:

$$C_2 = C^{-1}(A_1^{-1} A_{12} A_1^{-1} + A_2^{-1} A_{22} A_2^{-1}) C^{-1}$$

where $$A_1 = \frac{1}{\omega_1} A_{11} + A_{12}$$

corresponds to the covariance of the first signal and $$A_2 = \frac{1}{\omega_2} A_{21} + A_{22}$$

corresponds to the covariance of the second signal, and $C_2$ is implicitly determined to be $C-C_1$.

9. The computer readable memory of claim 8 including instructions for determining $\omega_1$ and $\omega_2$ so that said covariance matrix C or a sub-block of C is of minimum size according elements of the set of measures that includes the determinant, trace, weighted Lp norms, and maximum eigenvalue.

10. The computer readable memory of claim 8 including instructions for computing a fused signal relating to the state of a moving platform when one or more of said signals relate to measurements of previously mapped beacons.

11. The computer readable memory of claim 7 including instructions for determining said numbers, $\omega_1, \ldots \omega_n$, so that said covariance matrix C or a sub-block of C is of minimum size according elements of the set of measures that includes the determinant, trace, weighted Lp norms, and maximum eigenvalue.

12. The computer readable memory of claim 7 including instructions for computing a fused signal relating to the state of a moving platform when one or more of said signals relate to measurements of previously mapped beacons.

13. A specialized or programmed signal processing system for producing a fused signal from a set of n>1 signals encoding information obtained in part from a physical measuring device, each element i, $1 \leq i \leq n$, of which contains information defining a vector $a_i$ representing the estimated mean state of a physical system and a covariance matrix $$A_i = \frac{1}{\omega_i} A_{i1} + A_{i2}$$

that represents a consistent estimate of the squared error associated with the said vector for any value of $\omega_i$ between 0 and 1, inclusive, where the covariance matrix $A_{i,2}$ underestimates the expected squared error in the said vector that is known to be statistically independent of the errors in the remaining n−1 signals, comprising:

means for forming a fused signal that can be represented as a mean vector c and covariance C defined mathematically by:

$$C^{-1} = \sum_{i=1}^{n} H_i^T \left( \frac{1}{\omega_i} A_{i1} + A_{i2} \right)^{-1} H$$

$$c = C \sum_{i=1}^{n} H_i^T \left( \frac{1}{\omega_i} A_{i1} + A_{i2} \right)^{-1} a_i$$

where any summand of the above summations containing $\omega_i$, 0 is defined to be zero and each matrix $H_i$ defines the transformation from the coordinate frame of signal 1 to the coordinate frame of the fused signal, and the set of real-valued numbers, $\omega_1, \ldots, \omega_n$, sum to one and are computed using an optimization algorithm to minimize some measure of the size of the fused covariance matrix C;

means for transmitting a signal derived from the fused signal.

14. The signal processing system of claim 13 including means for the case in which said n is equal to 2 for producing a fused signal that is augmented to include split covariance information in which the independent error covariance component $C_2$ is defined mathematically as:

$$C_2 = C^{-1}(A_1^{-1} A_{12} A_1^{-1} + A_2^{-1} A_{22} A_2^{-1}) C^{-1}$$

where $$A_1 = \frac{1}{\omega_1} A_{11} + A_{12}$$

corresponds to the covariance of the first signal and $$A_2 = \frac{1}{\omega_2} A_{21} + A_{22}$$

corresponds to the covariance of the second signal, and $C_2$ is implicitly determined to be $C - C_1$.

15. The signal processing system of claim 14 including means for determining $\omega_1$ and $\omega_2$ so that said covariance matrix C or a sub-block of C is of minimum size according elements of the set of measures that includes the determinant, trace, weighted Lp norms, and maximum eigenvalue.

16. The signal processing system of claim 14 including means for computing a fused signal relating to the state of a moving platform when one or more of said signals relate to measurements of previously mapped beacons.

17. The signal processing system of claim 13 including means for determining said numbers, $\omega_1 \ldots \omega_n$, so that said covariance matrix C or a sub-block of C is of minimum size according elements of the set of measures that includes the determinant, trace, weighted Lp norms, and maximum eigenvalue.

18. The signal processing system of claim 13 including means for computing a fused signal relating to the state of a moving platform when one or more of said signals relate to measurements of previously mapped beacons.

\* \* \* \* \*